Feb. 1, 1966 L. L. HENGEHOLD 3,232,171
UNIVERSAL MILLING AND BORING MACHINES
Filed April 14, 1959 13 Sheets-Sheet 1

INVENTOR.
LEO L. HENGEHOLD
BY Jugelter & Jugelter
ATTORNEYS

Feb. 1, 1966 L. L. HENGEHOLD 3,232,171
UNIVERSAL MILLING AND BORING MACHINES
Filed April 14, 1959 13 Sheets-Sheet 3

INVENTOR.
LEO L. HENGEHOLD
BY Jugelter & Jugelter
ATTORNEYS

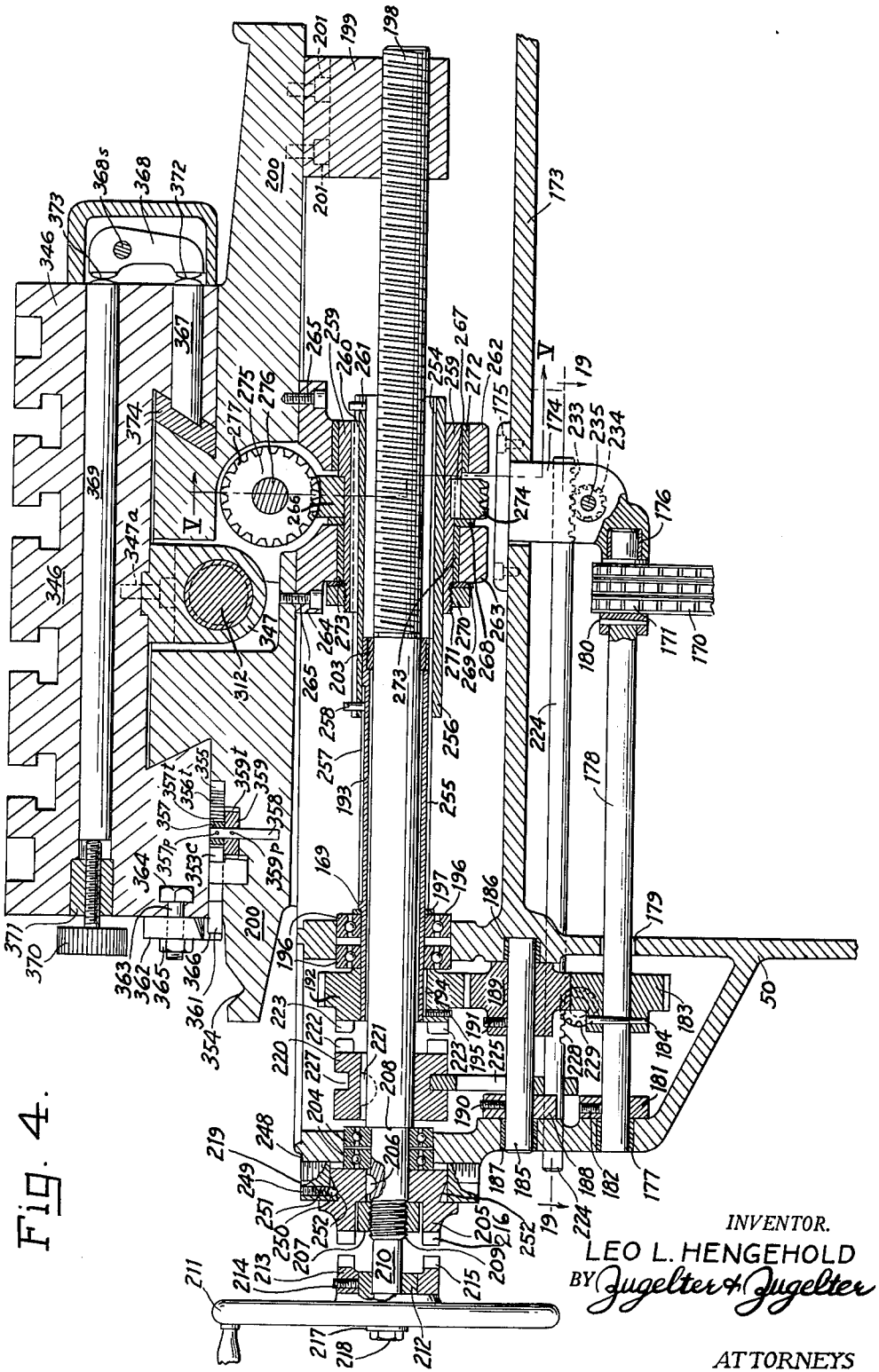

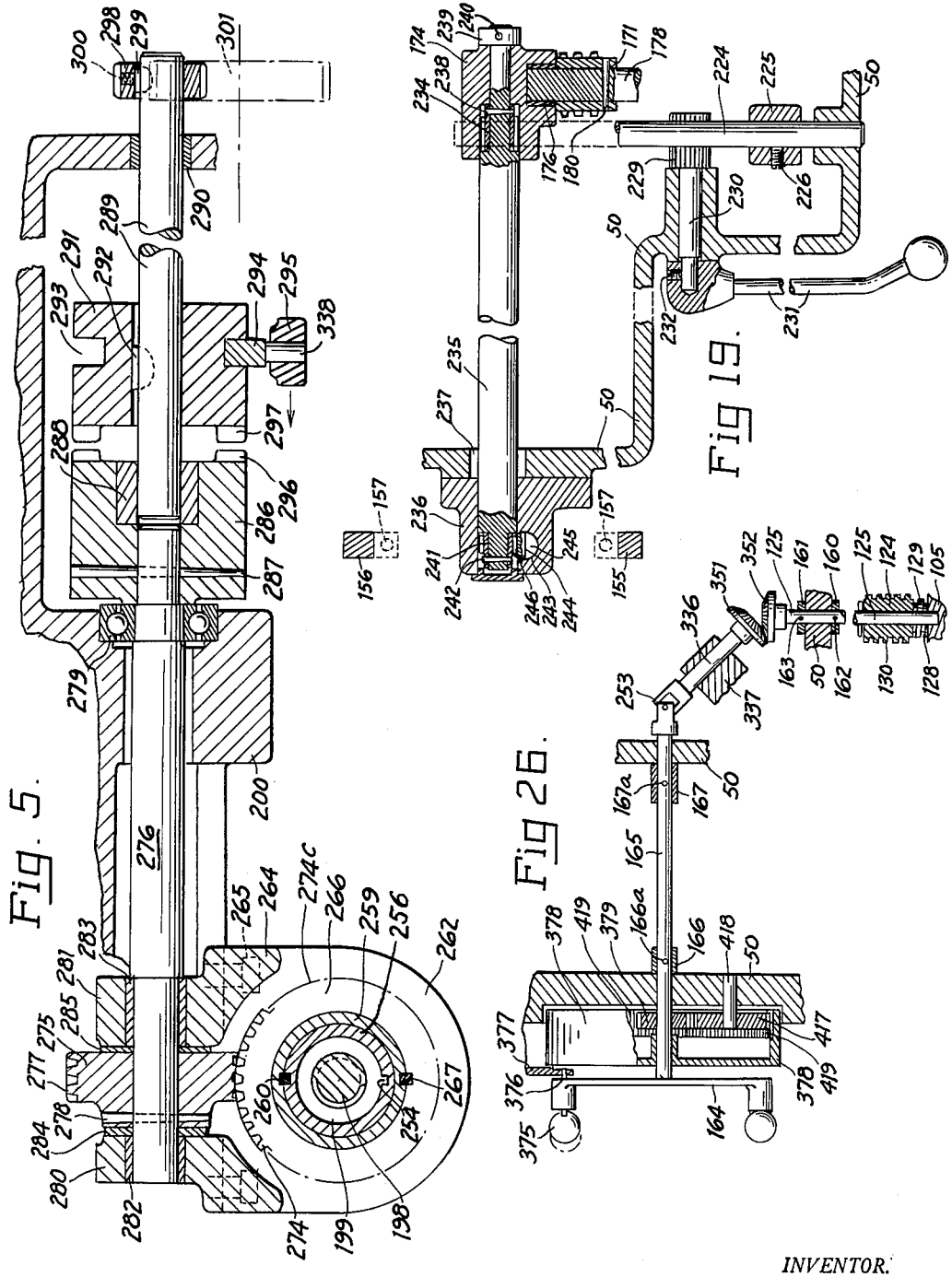

Feb. 1, 1966    L. L. HENGEHOLD    3,232,171
UNIVERSAL MILLING AND BORING MACHINES
Filed April 14, 1959    13 Sheets-Sheet 6
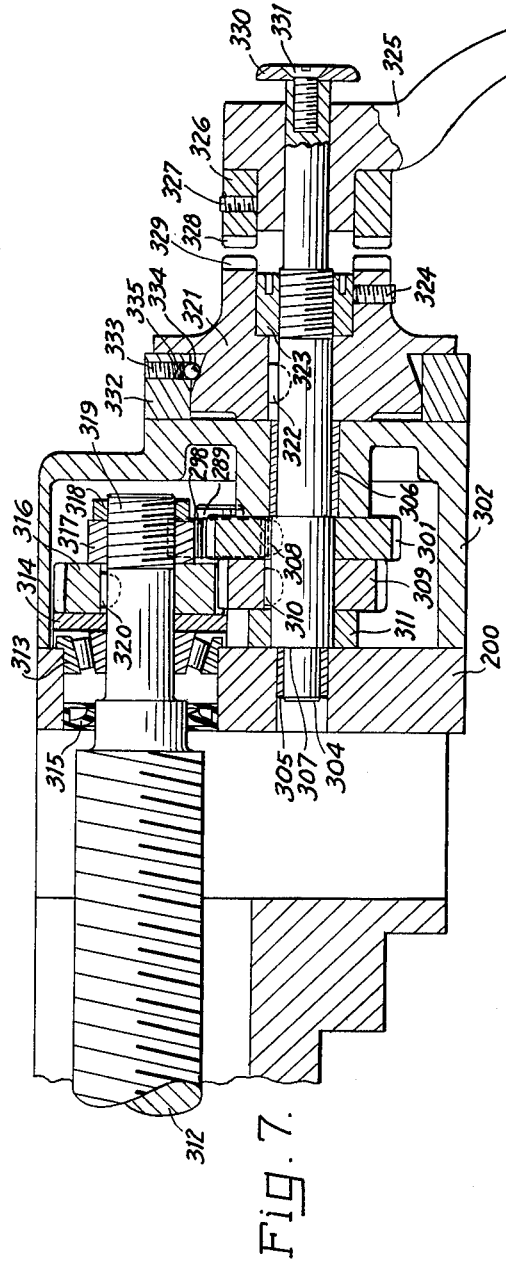
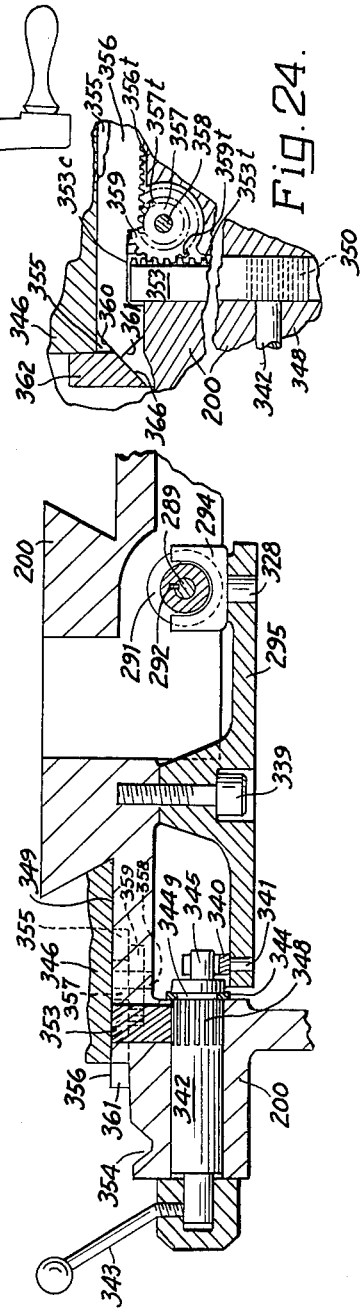
INVENTOR.
LEO L. HENGEHOLD
BY Jugelter & Jugelter
ATTORNEYS

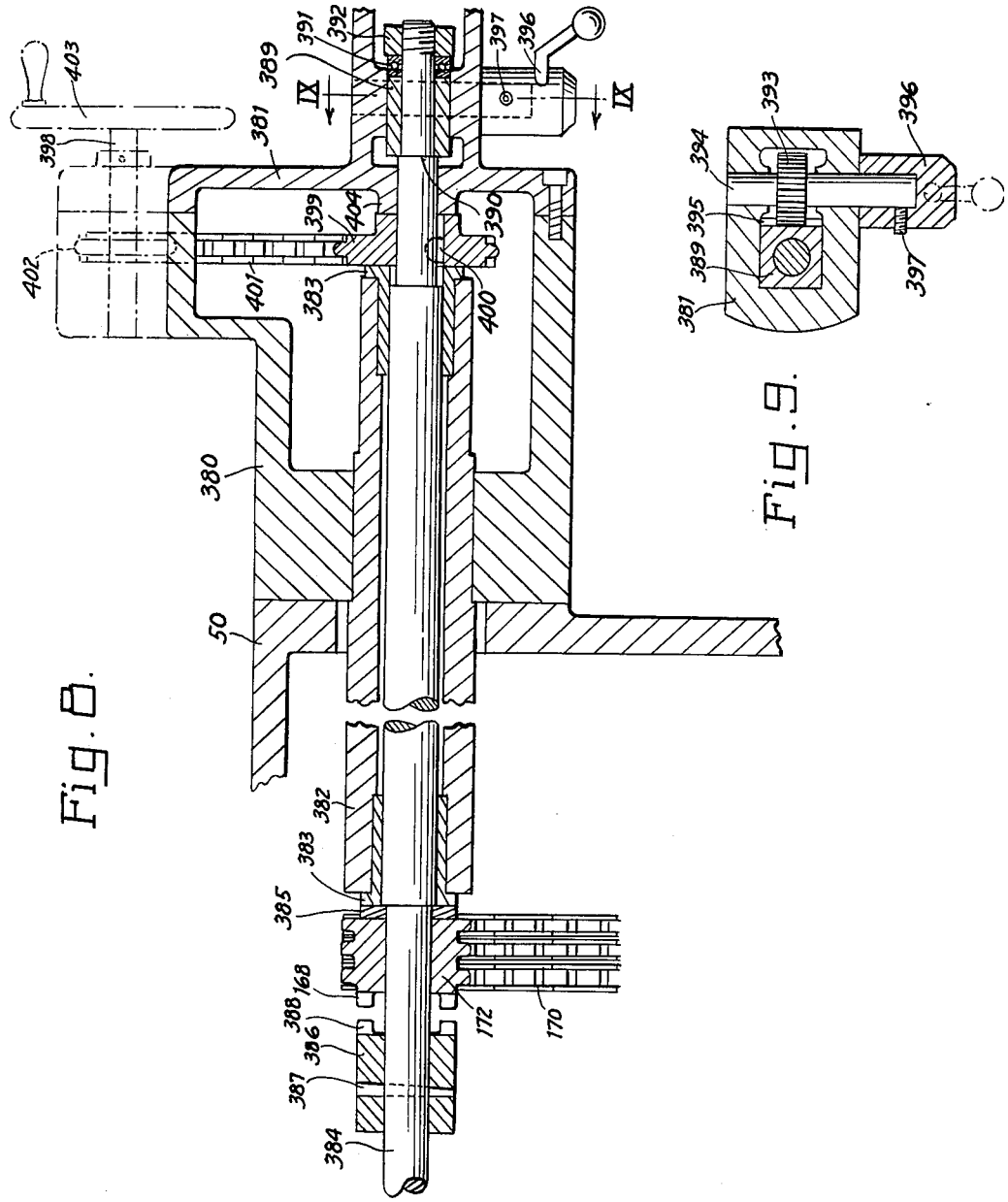

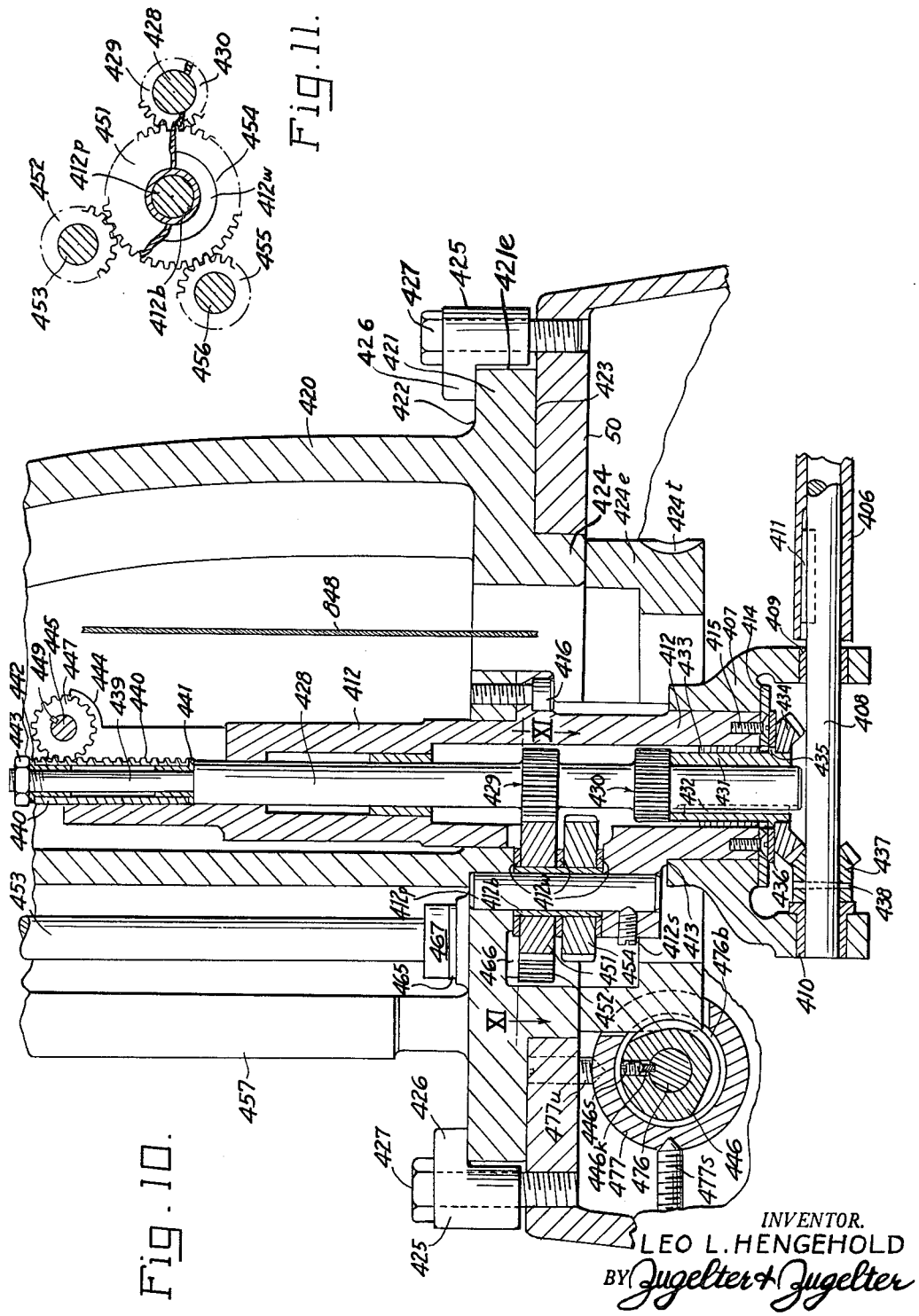

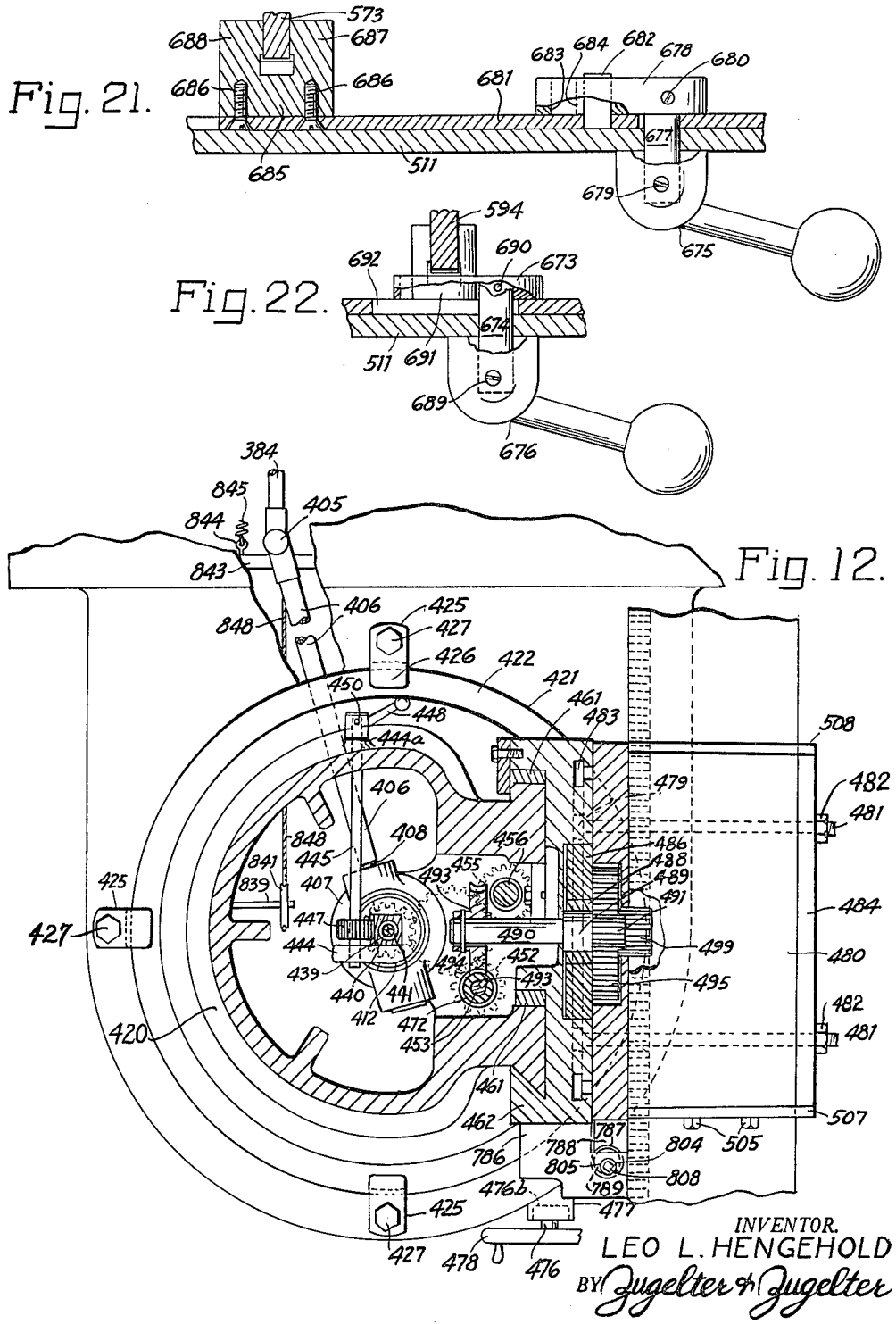

Feb. 1, 1966   L. L. HENGEHOLD   3,232,171
UNIVERSAL MILLING AND BORING MACHINES
Filed April 14, 1959   13 Sheets-Sheet 10
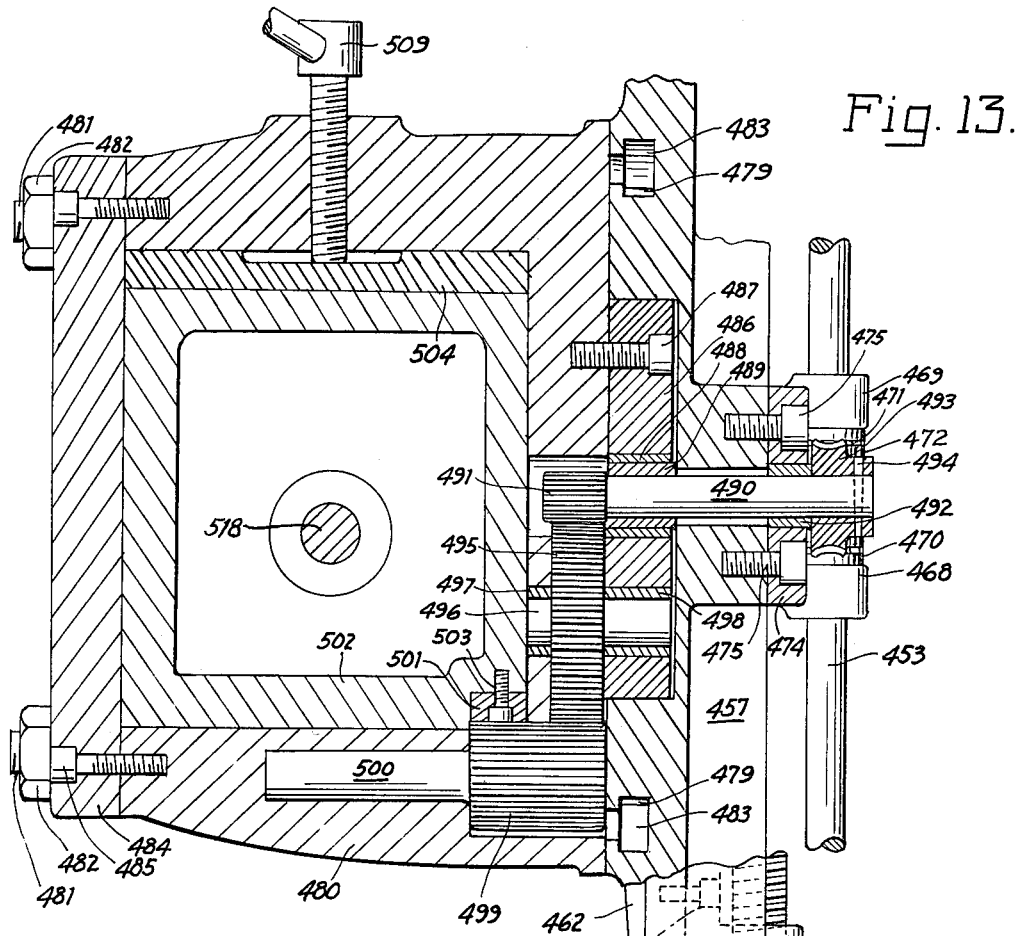
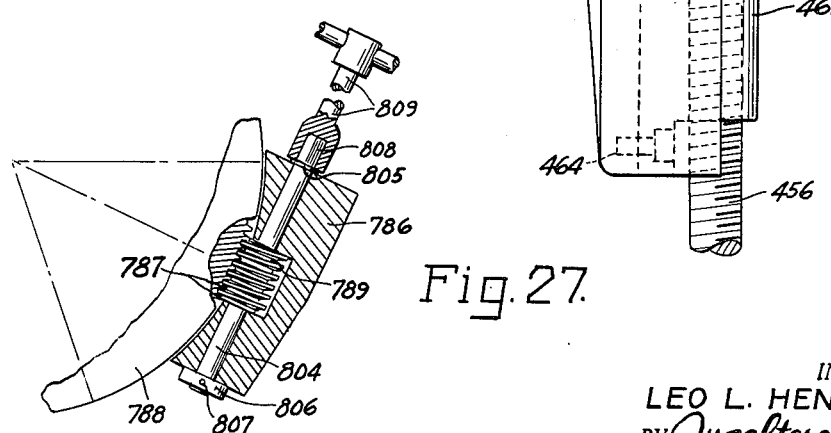
INVENTOR.
LEO L. HENGEHOLD
BY Jugelter & Jugelter
ATTORNEYS

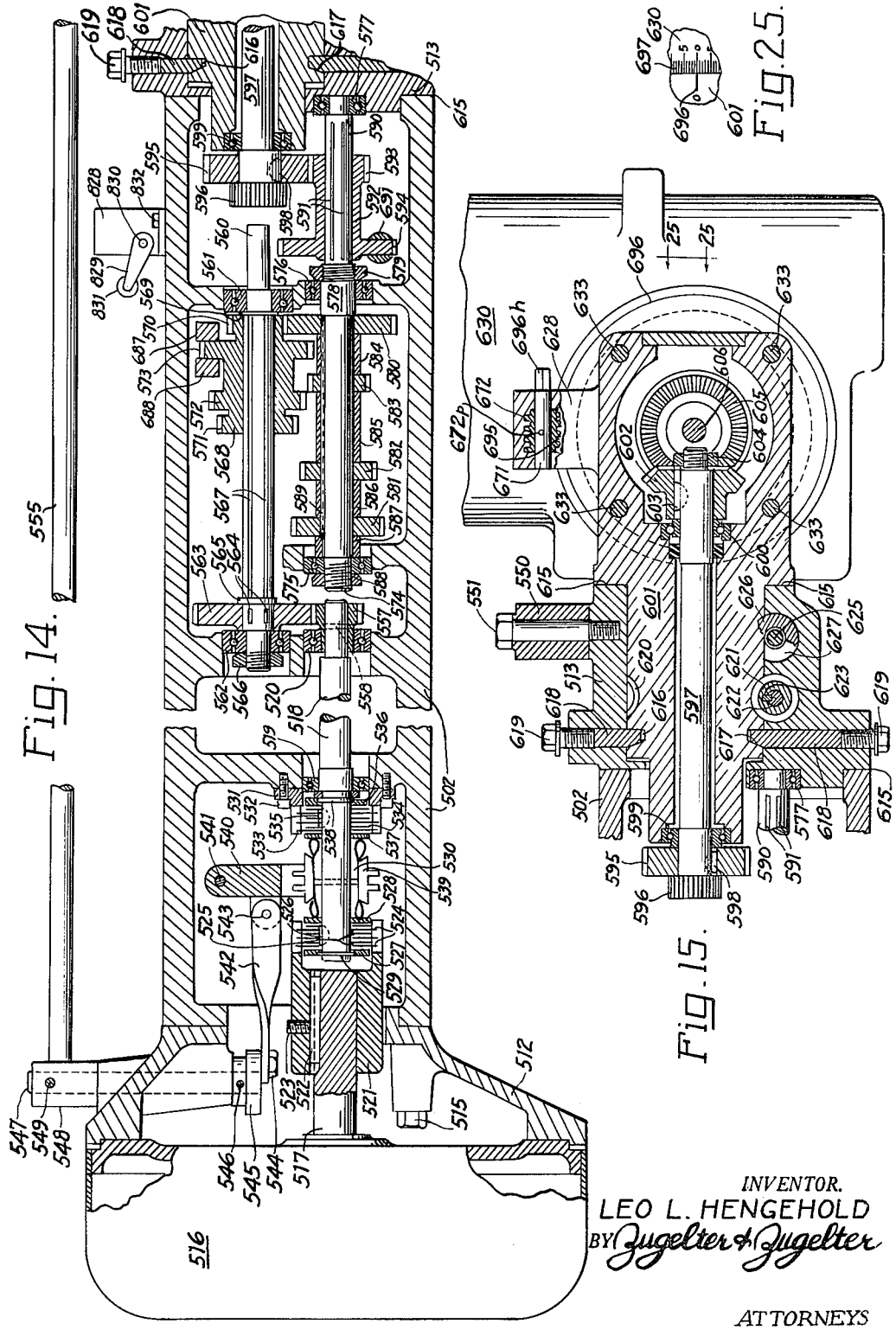

Feb. 1, 1966 L. L. HENGEHOLD 3,232,171
UNIVERSAL MILLING AND BORING MACHINES
Filed April 14, 1959 13 Sheets-Sheet 12
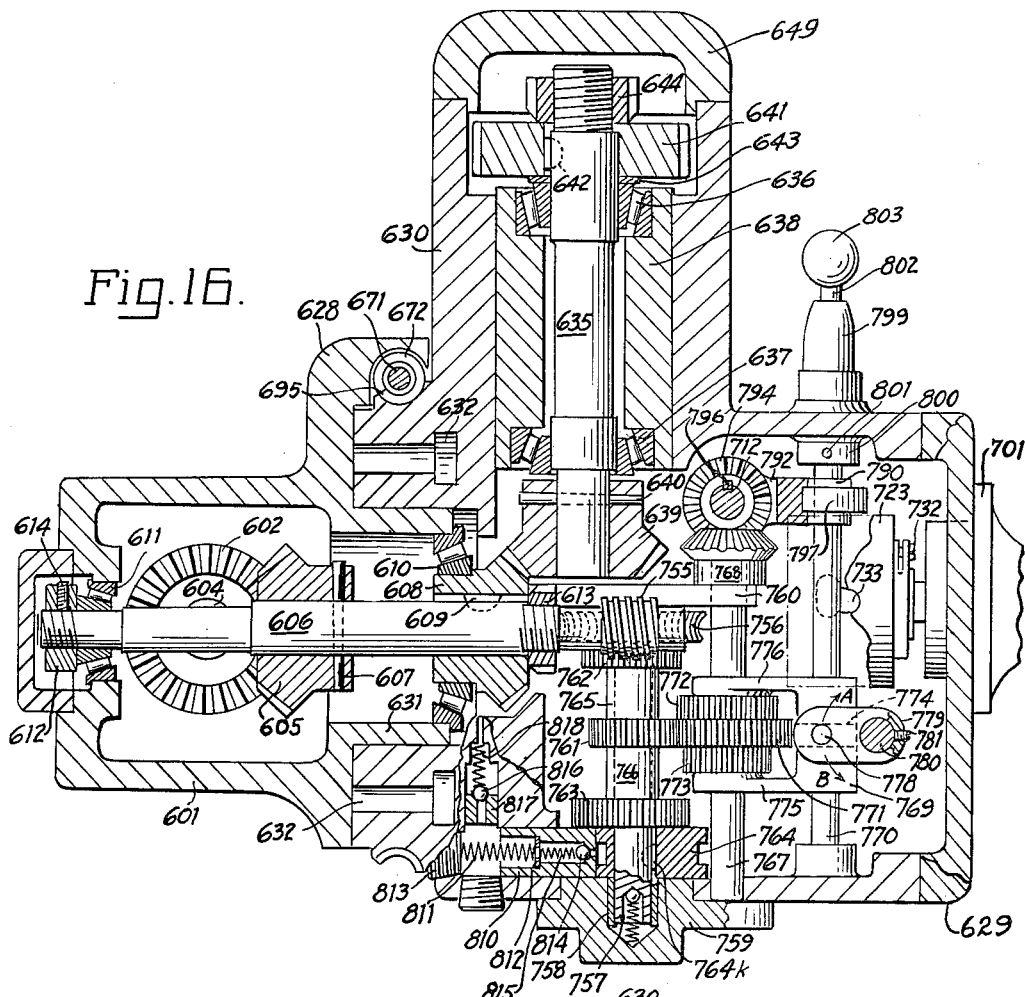
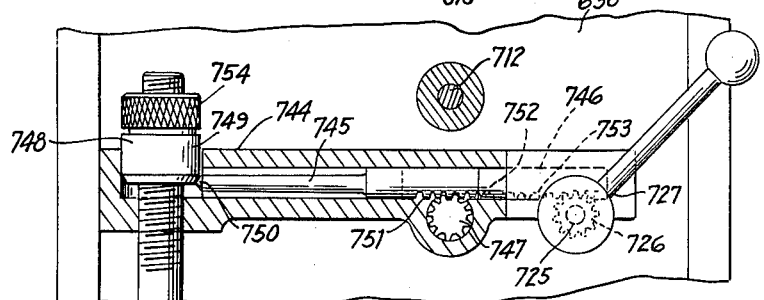
INVENTOR.
LEO L. HENGEHOLD
BY Jugelter & Jugelter
ATTORNEYS Feb. 1, 1966  L. L. HENGEHOLD  3,232,171
UNIVERSAL MILLING AND BORING MACHINES
Filed April 14, 1959  13 Sheets-Sheet 10
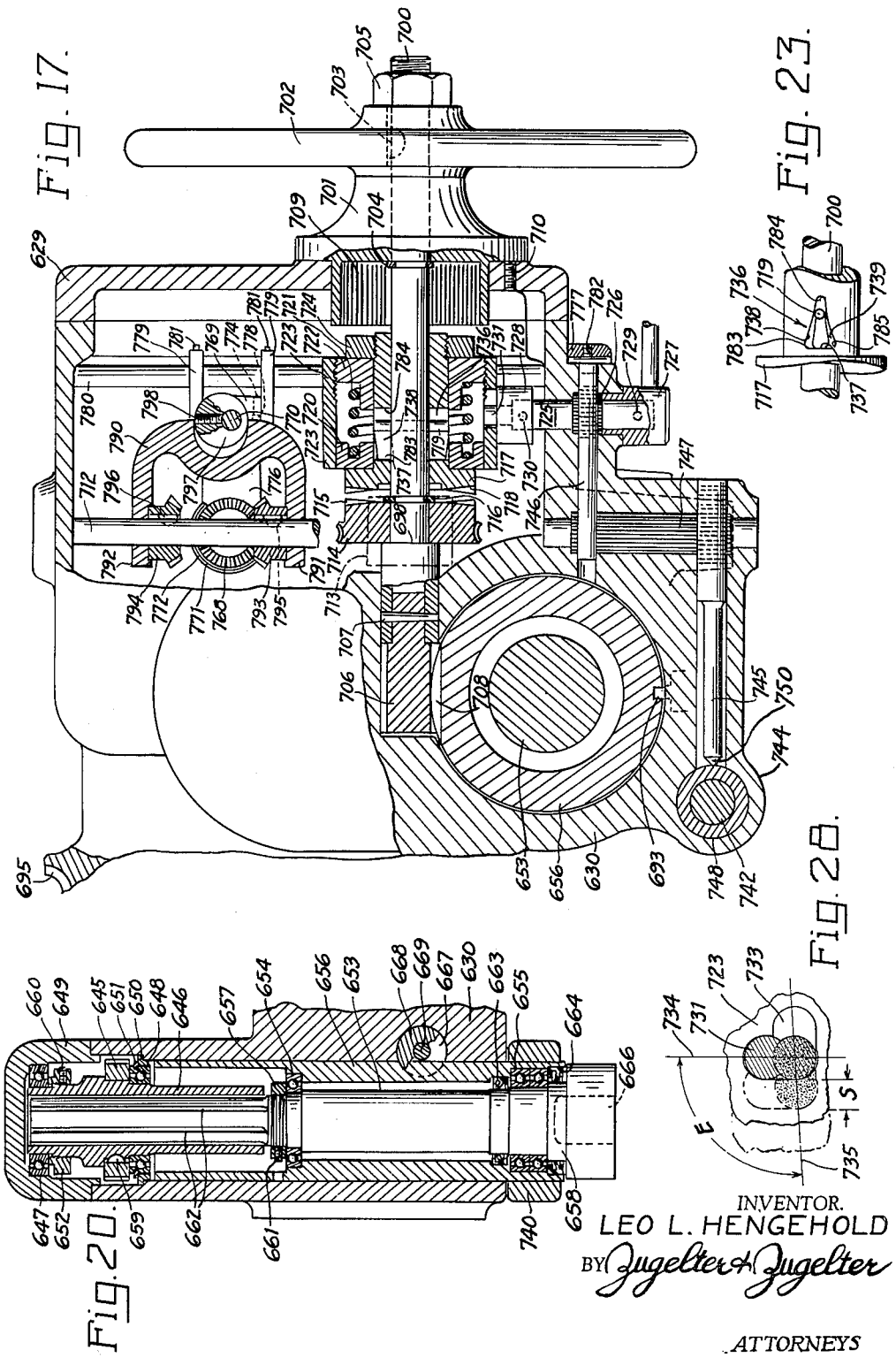
INVENTOR.
LEO L. HENGEHOLD
BY Jugelter & Jugelter
ATTORNEYS United States Patent Office 3,232,171
Patented Feb. 1, 1966

3,232,171
UNIVERSAL MILLING AND BORING MACHINES
Leo L. Hengehold, Miami Township, Hamilton County,
Ohio (% Suburban Machine Co., 5963 Harrison Ave.,
Cincinnati 11, Ohio)
Filed Apr. 14, 1959, Ser. No. 806,259
9 Claims. (Cl. 90—17)

This invention relates to machine tools and more particularly to a universal jig boring and milling machine.

An object of this invention is to provide a universal jig boring and milling machine.

Another object of this invention is to provide a machine of the above character having great versatility and large capacity for its size.

Another object of this invention is to provide a machine of the above character upon the table of which a work piece may be mounted in fixed relation and milling and boring operations performed thereon from a wide variety of angularly rotated positions with no or minimum remounting of the work piece.

An object of this invention is to provide a machine of the above character in which the controls used frequently by the operator are grouped within convenient reach of the operator for ease in manipulation with minimum reaching effort.

Another object of this invention is to provide a machine of the above character having a base upon which a column rotatable about a vertical axis is supported, a saddle movable up and down the column, and carrying an elongate overarm for swinging about an axis perpendicular to the column axis and shiftable longitudinally of radii of the axis perpendicular to the column axis, a head carrier swingable about an axis parallel to the radius along which said overarm is longitudinally shiftable, a head rotatable about an axis extending radially from the axis of head carrier rotation, and a quill supporting a rotatable spindle and advanceable along an axis parallel to a radius of the axis of head rotation.

A further object of this invention is to provide a machine of the above character having a saddle supported on said base for reciprocation and a workpiece supporting table mounted upon said saddle for reciprocation relative thereto and transversely of the direction of reciprocation of said saddle.

A further object of this invention is to provide in a device of the foregoing character a power transmission unit supported on an angle plate forming part of the base, said power transmission unit comprising a motor, rapid traverse assembly, and feed turret.

A further object of this invention is to provide for a power transmission unit of the above character, a feed turret comprising a ring frame, a turret frame supported thereby for rotation, an input shaft supported for rotation coaxially in said turret frame, an input gear secured to said input shaft for rotation therewith, an output shaft supported for rotation about a fixed axis parallel to the axis of the input shaft, an output gear secured to the output shaft for rotation therewith, a plurality of like compound gears supported for rotation about respective axes in fixed relation to said turret frame and spaced radially from said input gear, said compound gears each having first and second sets of teeth disposed upon respective pitch circles of different diameter, the first set of teeth being adapted to drivingly engage the output gear when the axis of that compound gear is coplanar with the axes of the output gear and the input gear, a plurality of idler gears supported for rotation about respective axes which are in fixed relation to the turret frame, one of said idler gears being in continuous cooperative engagement with the input gear, each of said idler gears being in cooperative engagement with the first set of teeth of one respective adjacent compound gear and the second set of teeth of the other adjacent compound gear, whereby rotation of the input gear effects simultaneous corresponding rotation in like direction of the compound gears at differing speeds, and means for rotating the turret frame to index the same to support a desired one of said compound gears in meshing engagement with said output gear whereby said output shaft may be positively rotated with predetermined relation to the rotation of said input shaft and whereby reindexing of the turret frame may be effected to alter the speed of rotation of the output shaft without altering its direction of rotation.

Another object of this invention is to provide a machine of the above character having a base, a saddle mounted for linear reciprocation on said base, a workpiece supporting table mounted on said saddle for linear reciprocation transversely of the line of saddle movement, a column supported for rotation about an axis perpendicular to the plane of table reciprocation, a column saddle movable along said column parallel to the axis thereof, a saddle plate supported by said column saddle for rotation about an axis perpendicular to the column axis, an elongated overarm extending through said saddle plate for longitudinal reciprocation and swingable in unison with said rotatable saddle plate, a head carrier supported by said overarm and swingable about an axis extending longitudinally of said overarm, a head supported by said head carrier for rotation about an axis extending radially of said head carrier axis, and a spindle supporting quill reciprocable in said head.

Another object of this invention is to provide a machine of the above character having a base, said base having a preassembled unit comprising an angle plate adapted to support an electric motor and associated feed and rapid traverse power transmission means in said base and to close the wall opening in said base through which said supported means are inserted as a preassembled unit.

Another object of this invention is to provide in a device of the above character having a stationary base, a rotatable column mounted thereon, a column saddle advanceable up and down the column, an overarm, an overarm saddle cooperating with said overarm and secured in pivotal relation to said column saddle, said overarm being shiftable longitudinally in said overarm saddle, means for advancing said column saddle up and down said column and for longitudinally shifting said overarm in said overarm saddle comprising a saddle feed screw supported for rotation and against axial displacement relative to said column and in cooperative engagement with said column saddle, a rack secured to and extending longitudinally of said overarm, an overarm feed pinion supported in cooperative engagement with said rack, a worm pinion shaft supported in said column saddle for rotation in coaxial relation to said overarm saddle, means coupling said worm pinion shaft and said overarm feed pinion for related rotation, a worm wheel secured to said worm pinion shaft for rotation in unison therewith, a worm, means supporting said worm in cooperative engagement with said worm wheel, a rotatable feed shaft extending coaxially and slidably through said worm and parallel to the column axis, means coupling said worm to said feed shaft whereby rotation of said feed shaft effects corresponding longitudinal displacement of said overarm relative to said overarm saddle, a column pinion shaft supported in coaxial relation to said column for rotation and longitudinal reciprocation, a column pinion shaft shifter adapted to axially shift the column pinion shaft between first and second limit positions, means adapted to drivingly couple said column pinion shaft when in first limit position of axial displacement to said saddle feed screw, means adapted to drivingly couple said column pinion shaft when in a second limit position of axial displacement to said feed shaft, a rotatable column bevel gear bracket supported in coaxial relation to said column, a bevel gear pinion shaft supported by said bevel gear bracket, a pair of cooperating bevel gears respectively coupled to said column pinion shaft and said bevel gear pinion shaft and supported in cooperative relation to each other, a hand wheel bracket shaft supported by said base for rotation, means coupling said hand wheel bracket shaft and bevel gear pinion shaft for rotation in unison, whereby rotation of said hand wheel bracket shaft effects advancement of the column saddle along the column when the column pinion shaft is in the first limit position and longitudinal shifting of the overarm in said overarm saddle when the column pinion shaft is in the second limit position.

Another object of this invention is to provide in a device of the above character a worm supported for rotation about and against axial displacement along an axis fixed in relation to the column saddle, at least a portion of a set of worm wheel teeth being provided on the overarm saddle and adapted to cooperate with the worm whereby rotation of the worm effects angular movement of the overarm saddle relative to the column saddle facilitating precise angular orientation of the overarm.

A further object of this invention is to provide a device of the foregoing character having a base and a rotatable column supported thereon, said column having a skirt portion extending into said base, worm teeth on the skirt, a cartridge, a shaft journaled for rotation in said cartridge, a worm secured to said shaft, a hand wheel secured to said shaft, said cartridge, shaft, worm and hand wheel being adapted for insertion into cooperative relation to said base, said base being adapted to support said cartridge in cooperative relation to securing means with said worm in cooperative engagement with said worm wheel teeth, whereby rotation of said hand wheel effects angular rotation of the column.

A further object of this invention is to provide an overarm having a cylindrical portion extending from one end thereof, a plurality of recesses therein separated by integral portions each of worm wheel tooth form, a head carrier receiving said cylindrical portion and secured against displacement axially of said cylindrical portion, a shaft extending through said head carrier adjacent said cylindrical portion, a worm secured to said shaft for rotation therewith and thereby supported in cooperative engagement with said worm wheel tooth form portions, whereby rotation of said shaft effects corresponding swinging of said head carrier about said cylindrical portion and clamp means for locking said head carrier against swinging about said cylindrical portion.

A further object of the invention is to provide means for effecting power movement of the quill including a rotatable shaft mechanically coupled to said quill, a power rotatable first clutch member supported by said shaft and rotatable thereon, a second clutch member on said shaft, said second clutch member having a hub in which a pair of similar radially opposite apertures are provided, a pin extending diametrically through said shaft and extending into said hub apertures, whereby the second clutch member is coupled to said shaft for limited axial displacement therealong and for limited relative rotational movement of a magnitude related to the axial displacement along the shaft of the second clutch member relative to the first clutch member, and means for alternatively resiliently urging said first and second clutch members into engagement and positively into spaced nonengaging relation as desired.

Another object of this invention is to provide a device of the above character, characterized by the fact that each of said aperture is bounded by two symmetrically disposed helical face portions which meet a diametrical axial plane of the shaft at an angle of 15 degrees and a third radially disposed face portion which is closest to the first clutch member engaging portion of the second clutch member, said helical and radial face portions each being so disposed that line contact therewith may be made by said pin.

A further object of this invention is to provide in a device of the above character, a ram having an elongate, hollow central portion, an electric motor supported on an end of said ram, a head carrier supported on the other end of said ram, a head supported on said head carrier and having a rotatable spindle, power transmission means housed and supported in said ram, head carrier and head by means of which said ram supported motor may be coupled in driving relation to said spindle.

A further object of this invention is to provide a device of the above character characterized by the fact that said power transmission means includes a clutch-brake whereby said power transmission means is coupled to said motor or uncoupled from said motor and biased toward immobility.

A further object of this invention is to provide a device of the above character having power transmission means, which include a rotatable shaft through which power is delivered to said head and speed change mechanism, whereby the speed of said rotatable shaft by which power is delivered to said head may be selected.

A further object of this invention is to provide a device of the foregoing character having a head, a quill mounted for axial reciprocation in said head, a rotatable shaft mechanically coupled to said quill for reciprocating same, a power rotatable first clutch member supported by said shaft and rotatable thereon, a second clutch member on said shaft, said second clutch member having a hub in which a pair of similar, radially opposite apertures are provided, a pin extending diametrally through said shaft and extending into said hub apertures, whereby the second clutch member is coupled to said shaft for limited axial displacement therealong and for limited relative rotational movement of a magnitude related to the axial displacement along the shaft of the second clutch member relative to the first clutch member, a cup-like sleeve member receiving and encircling at least a portion of the hub of the second clutch member, resilient means cooperating with said second clutch member and said cup-like sleeve resiliently urging said cup-like sleeve away from said first clutch member, an aperture in said sleeve, a crank adapted to cooperatively engage said sleeve and extending into said aperture, means for swinging said crank through a predetermined angle whereby said sleeve may be positively advanced toward said first clutch member to resiliently urge said second clutch member into engagement with said first clutch member to couple said power rotatable first clutch member and said rotatable shaft for rotation in unison and means adapted for actuation by advancement of said quill for positively shifting said cup-like sleeve away from said first clutch member, the hub of said second clutch member having stop means adapted to cooperate with said cup-like sleeve member whereby said second clutch member is shifted out of engagement with said first clutch member.

A further object of this invention is to provide first and second parallel shafts coupled for rotation in unison, a hand wheel, said hand wheel supported by and being adapted to rotate in unison with said first shaft, said second shaft being axially reciprocable, a power-driven clutch member mounted on said second shaft for relative rotation thereabout, a driven clutch member secured to said shaft for rotation in unison therewith and being advanceable into and out of engagement with said power driven clutch member by axial reciprocation of said second shaft, a reciprocable, nonrotatable collar through which said second shaft extends and to which said shaft is secured against axial relative movement, a plurality of rack teeth on said collar, a rack pinion supported for rotation and in engagement with said rack teeth and means for rotating said pinion whereby said second shaft may be axially shifted to couple and uncouple said shaft from driven relation to said power driven clutch member.

A further object of this invention is to provide for a machine tool having a linearly shiftable table in cooperative relation to an adjustable table gib, means for binding said gib, to lock said table in fixed relation to the support therefor, said means comprising an upper table clamp rod and a lower table clamp rod extending in parallel relation and transversely of the direction of table reciprocation, a rocker supported for rocking about an axis in fixed relation to said table and adapted to cooperatively and simultaneously engage a respective end of each of said upper and lower clamp rods, and means adapted to urge said upper clamp rod toward said rocker whereby said rocker may be swung to urge the lower clamp rod to clamp the gib against the table support.

The above and other objects and features of this invention will in part be obvious and will in part be apparent to those having ordinary skill in the art to which this invention pertains, from the following description, the accompanying drawings and the appended claims.

In the drawings:

FIG. 4 is a fragmentary view in vertical section of a portion of the machine base, taken generally through the axis of rotation of the saddle feed or cross feed screw;

FIG. 5 is a fragmentary view in vertical section taken on the line V—V in FIG. 4;

FIG. 6 is a fragmentary view in vertical section taken transversely of the saddle and showing the saddle, saddle clutch shaft and associated clutch shifter mechanism for controlling the clutch through which power may be applied to the table feed screw rotating mechanism;

FIG. 7 is a fragmentary view in vertical section taken longitudinally of the saddle and showing the table feed screw and associated mechanism for manual and power rotation thereof;

FIG. 8 is a fragmentary view in horizontal section of a portion of the column feed mechanism, including the manual means for actuating it and for controlling application of power thereto, some portions broken away being shown in dot-dash lines;

FIG. 9 is a view in vertical section taken along the line IX—IX in FIG. 8;

FIG. 10 is a view in generally vertical section of the lower portion of the column and adjacent portions of the base, portions thereof being broken away showing part of the column rotating means and part of the feed mechanism and shifter means;

FIG. 11 is a partially schematic horizontal plan view in section taken generally along the line XI—XI in FIG. 10, parts thereof being broken away and showing some of the gears forming part of the column feed mechanism in cooperative relation;

FIG. 12 is a top plan view of the column, column saddle and overarm or ram, portions thereof being broken away to more clearly illustrate portions of the column, column rotating, column saddle, column saddle plate, column saddle plate rotating and overarm feed mechanism;

FIG. 13 is a view in generally vertical section of the ram and column saddle in cooperative relation to the column, column feed shaft and the saddle feed screw;

FIG. 14 is a view in side elevation of the ram or overarm generally in section and partly broken away, showing the overarm motor and associated power transmitting mechanism;

FIG. 15 is a view in side elevation, partly in section of the head carrier in association with adjacent cooperating portions of the overarm and the head and associated portions of the mechanism for transmitting power from the motor to the head.

FIG. 16 is a view in generally vertical section broken away to show the means by which power is supplied to the quill assembly for rotating the spindle and speed and direction change gearing forming part of the power feed for quill reciprocation;

FIG. 17 is a top plan view of the head, parts thereof being broken away to show the manual and power driven quill advancing or feed mechanism including the overload clutch and automatic kick-out;

FIG. 18 is a fragmentary view in front elevation partly in section of portions of the automatic kick-out mechanism shown in FIG. 17;

FIG. 19 is a fragmentary top plan view in section, partly broken away, showing the saddle feed kick-out mechanism;

FIG. 20 is a view in vertical section of the spindle, quill and associated portions of the head taken on a plane parallel to and in front of the central portion of FIG. 16;

FIG. 21 is a fragmentary top plan view, partly broken away, of a portion of the overarm or ram and the associated spindle speed in range selector;

FIG. 22 is a fragmentary top plan view, partly broken away, of a portion of the overarm or ram and the associated spindle speed range selector;

FIG. 23 is a fragmentary view showing details of the quill feed pinion shaft and the driven clutch hub coupled thereto by pin means;

FIG. 24 is a fragmentary top view in generally horizontal section, partly broken away, showing structural details of the table power feed kick-out mechanism;

FIG. 25 is a fragmentary view in front elevation of portions of the head and head carrier indicated by the arrows 25—25 in FIG. 15;

FIG. 26 is a fragmentary view in vertical section showing the means for shifting and locking the feed turret end frames in relation to the feed turret frame and determining the speed of rotation of the feed turret output shaft relative to the speed of rotation of the feed turret input shaft;

FIG. 27 is a fragmentary view in vertical elevation, partly broken away, showing means for precisely tilting the overarm or ram and rotating its saddle with respect to the column; and FIG. 28 is a somewhat schematic fragmentary view in front elevation, partly in section, of the quill pinion feed shaft clutch sleeve and cooperating sleeve shifter crank pin.

In the specification and accompanying drawings like reference characters indicate like parts.

Figure 1:
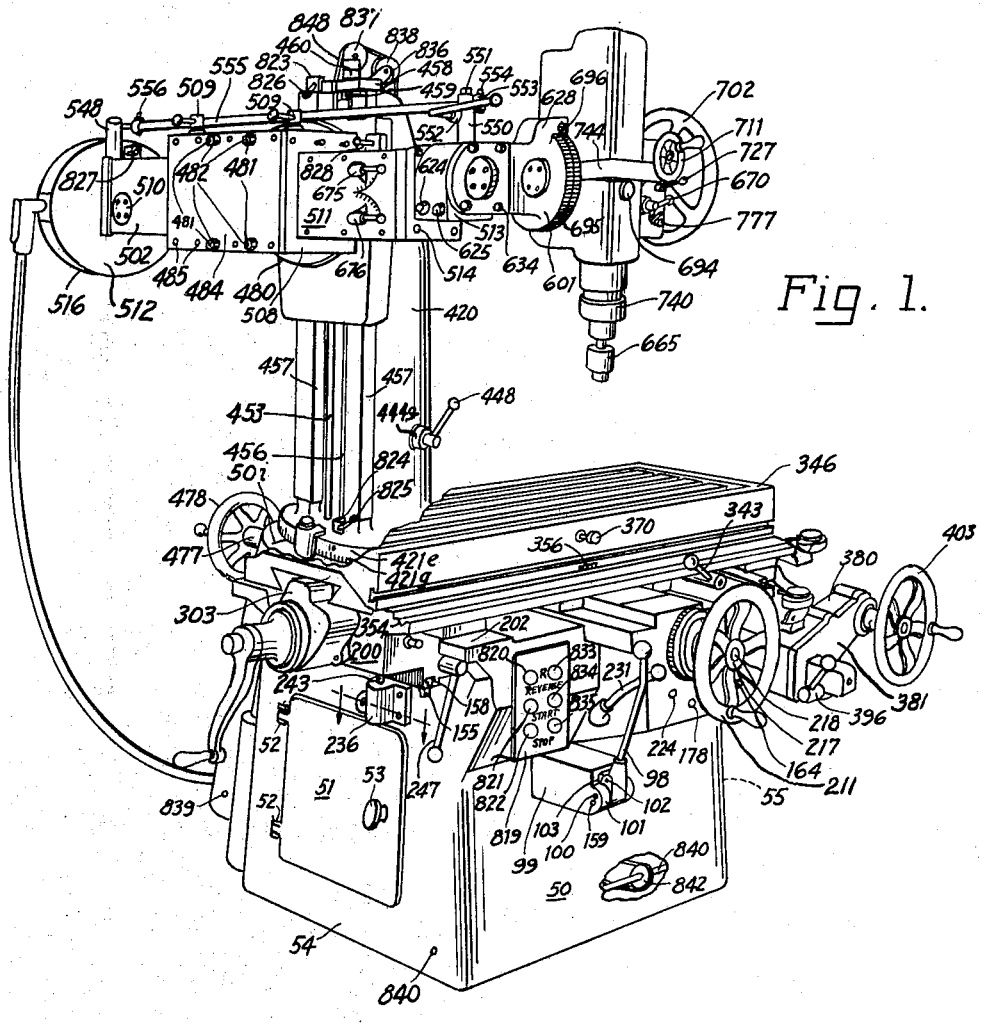
FIG. 1 is a general view in perspective of a machine embodying my invention in what presently appears to be a preferred form, portions of the machine being broken away to illustrate various features thereof and other portions thereof being omitted for clarity.

In FIG. 1 of the drawing is shown a universal vertical milling and boring machine having a base or frame 50. An access opening is provided in wall 54 of base 50 and a cover or door 51, hinged to base 50 at 52, is provided for closing same. Door knob 53 is provided for convenience in opening and closing door 51 and may be adapted to actuate door latching means (not shown) by which the door may be secured in the position shown in FIG. 1. A second opening is provided in wall 55 of base 50 in a location substantially opposite door 51. The opening in wall 55 is closed by an angle plate 56 (shown in FIG. 2) comprising a cover plate portion 57 which may be secured to wall 55 by any suitable means such as bolts, screws, or the like (not shown), and a bracket portion 58 formed integrally therewith. Bracket portion 58 is angularly related to cover plate portion 57 such that when cover plate 57 is secured to wall 55, closing the opening therein, bracket portion 58 projects substantially horizontally therefrom into the hollow interior of the base 50. Bracket portion 58 projects from cover plate portion 57 adjacent the lower edge thereof and supports the feed drive motor 59, the rapid traverse bearing bracket 60, and the mantel clock or feed turret 61, which may all be mounted upon bracket portion 58 to form a unitary assembly adapted to be inserted through the opening provided in wall 55 incident to mounting and securing of angle plate 56 in position relative to base wall 55. Motor 59 may be mounted on bracket plate 58 in any suitable manner if desired, mounting means (not shown) facilitating adjustment of the tension in roller chain 70 may be utilized. Sprocket wheel 63 is mounted upon and keyed to motor shaft 62 for rotation in unison therewith. Set screw 64 is provided to preclude axial displacement of sprocket wheel 63 along motor shaft 62.

Rapid traverse bearing bracket 60 is secured to angle bracket portion 58 by bolts or other suitable means (not shown). Bracket 60 has three pedestal portions 65 for cooperatively supporting antifriction bearings 66 and 67 in coaxial alignment. Rapid traverse drive shaft 68 is journaled for rotation in bearings 66. Sprocket wheels 69, 71 are mounted on shaft 68, keys 72 and 73 respectively serving to secure sprocket wheels 69 and 71 to drive shaft 68 for rotation in unison therewith. Chain 70 is trained in cooperative engaging relation over sprocket wheels 63 and 68 such that operation of the motor 59 effects rotation of rapid traverse drive shaft 68 and the associated members mounted thereon.

Figure 2:
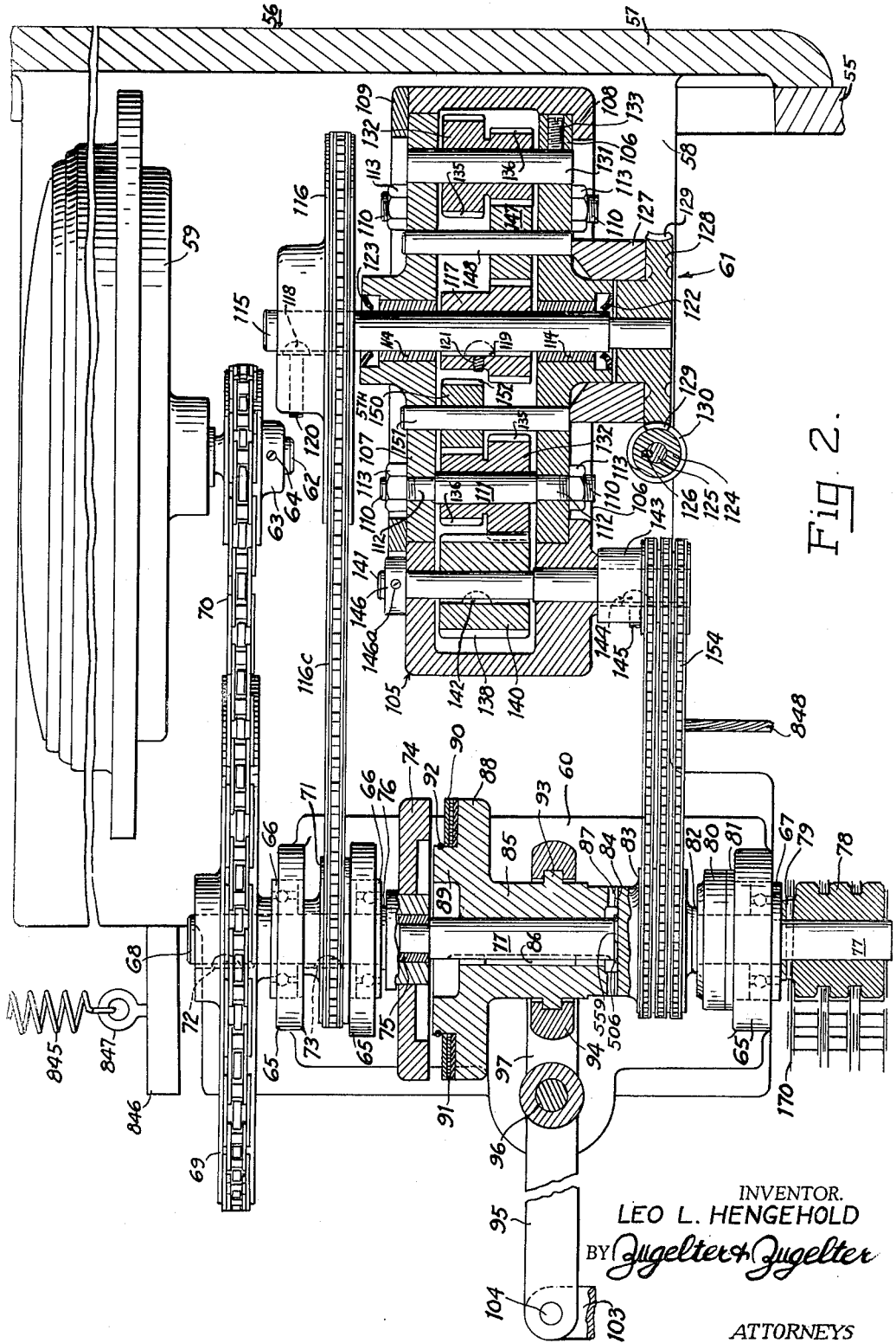
FIG. 2 is a top plan view of the feed drive motor, rapid traverse and feed turret assembly, housed in the base of the machine illustrated in FIG. 1, portions thereof being broken away to more clearly illustrate the structure and its operation.

Rapid traverse driving clutch plate 74 is mounted on drive shaft 68 for rotation in unison therewith. Drive shaft 68 may, as shown, have a collar or shoulder portion 76 adapted to cooperate with the adjacent bearing 66 and through which thrust loads imposed upon clutch plate 74 may be transferred to the rapid traverse bearing bracket 60. Clutch plate 74 has a central bearing 75 in coaxial alignment with rapid traverse drive shaft 68, as shown in FIG. 2. The rapid traverse driven shaft 77 is journaled for rotation in bearings 67 and 75, and is thus in coaxial alignment with shaft 68. A final drive sprocket wheel 78 is mounted on shaft 77 adjacent bearing 67 for rotation in unison with shaft 77. Sprocket 78 is secured against axial displacement along shaft 77 by means of taper pin 79 and cooperates with bearing 67 as is shown clearly in FIG. 2, to preclude axial shifting of shaft 77 toward shaft 68. Shifting of shaft 77 in the opposite direction, namely, away from shaft 68, is precluded by retaining ring 82 which engages spacing collar 80, which, in turn, cooperates with thrust washer 81 interposed between collar 80 and the adjacent bearing pedestal 65.

The feed clutch sprocket 83, mounted on shaft 77 adjacent retaining ring 82, is freely rotatable relative to shaft 77, but secured against axial displacement past retaining ring 82 toward collar 80 and by retainer ring 506 away from collar 80. Retainer ring 506 is partially received in groove 559 provided in shaft 77. Feed clutch sprocket 83 has clutch teeth 84 projecting axially therefrom and extending radially from adjacent shaft 77. Feed clutch 85 is mounted for reciprocation axially along shaft 77 into selective engagement with feed clutch sprocket 83 and in the alternative toward drive clutch plate 74 while continuously coupled to shaft 77 by key 86 for rotation in unison therewith. Feed clutch 85 has axially projecting clutch teeth 87 adapted to cooperate with the clutch teeth 84 of feed clutch sprocket 83, as shown in FIG. 2. When the clutch teeth 84 and 87 are in cooperative engagement, feed clutch sprocket 83 rotates in unison with shaft 77. Adjacent the opposite end of feed clutch 85, driven clutch plate portion 88 is provided. As illustrated in FIG. 2, boss or hub 89 projects from clutch plate 88 toward clutch plate 74. A pair of clutch facings 90 and a clutch disc 91 therebetween may be mounted in annular encircling relation upon boss 89, with one of the facings 90 adapted for flatwise abutting engagement with an adjacent cooperating face of clutch plate 88 and the second clutch facing 90 adapted to cooperatively engage clutch plate 74. Retaining ring 92 may be provided for retaining the clutch facings 90 and clutch disc 91 in the assembled relation, as illustrated in FIG. 2. Feed clutch 85 has a radially projecting rib 93 adapted to facilitate shifting of feed clutch axially of shaft 77. Shifter ring 94 has an internal annular channel or groove adapted to cooperatively receive the radially projecting rib 93. The rib 93 is free to rotate in that groove relative to ring 94 while axial displacement of rib 93 relative to ring 94 is precluded. A shifter crank 95 is mounted upon pivot post 96 projecting upwardly from rapid traverse bearing bracket 60. The crank arm 95 has a pair of fork arms 97 in cooperation with shifter ring 94, whereby swinging of crank arm 95 about pivot 96 effects reciprocation of shifter ring 94 and feed clutch 85 axially along shaft 77 to the desired one of three positions "feed," "neutral," or "rapid traverse." To effect shifting of feed clutch 85 from one to another of the three positions it is necessary to swing crank 95 about pivot 96. Link 103 is cooperatively connected to crank 95 by pivot pin 104 and to rapid traverse control lever 98 by pivot pin 102, as shown in FIG. 1. The lever 98, as shown in FIG. 1, may be pivotally secured to bracket 99 by pivot pin 100. The bracket 99 is integral with or secured in fixed relation to base 50 as shown in FIG. 1. If desired, suitable biasing means (not shown), such as a spring, may be provided in cooperative relation with the means for moving feed clutch 85, for biasing feed clutch 85 toward one of the three positions feed, neutral, or rapid traverse. Clutch 85 is preferably biased toward neutral position. I provide a friction latch in cooperative relation to lever 98. A screw 159 (shown in FIG. 1) is disposed in and threadedly engages the walls of a bore extending through lug 101 of bracket 99. Screw 159 is in spaced, parallel relation to pivot pin 100. A pair of depressoins (not shown) are provided in lever 98, one thereof registering with the bore in which screw 159 is disposed when lever 98 is in rapid traverse position, and the other when lever is in feed position. A latch member, such as a hard sphere, is provided and movable in the bore in lug 101. A compression spring is disposed between screw 159 and the sphere and loaded as desired by appropriate adjustment of screw 159 so as to frictionally secure lever 98 in either feed or rapid traverse position and thus prevent movement of lever 98 and clutch 85 toward neutral position, the position toward which clutch 85 is biased. Thus, the friction latch means adjustable by screw 159 serves to secure lever 98 in feed or rapid traverse positions while the means biasing clutch 85 serve to bias lever 98 toward and retain it in neutral position at other times.

When feed clutch 85 is in feed position, as shown in FIG. 2, it is in engagement with feed clutch sprocket 83 driven through feed turret 61 at a predetermined reduced speed, as will be explained subsequently. Angular rotation of shaft 77 in a direction opposite to the direction of angular rotation of motor shaft 62 and rapid traverse drive shaft 68 is thereby effected.

When feed clutch 85 is in neutral position, disengaged from feed clutch sprocket 83 and from clutch plate 74, shaft 77 is not subjected to rotation effecting forces being transmitted from motor 59 (except those of ineffective magnitude resulting from rotation of bearing member 75 relative to shaft 77).

When feed clutch 85 is in "rapid traverse" position, driven clutch plate 85 is adjacent and coupled to clutch plate 74 by the interposed clutch facings 90 and disc 91 compressed therebetween to effect union rotation of shafts 68 and 77. Thus, in shifting of feed clutch 85 from feed to rapid traverse position, the speed of rotation of shaft 77 is increased and its direction of rotation is reversed.

Feed turret 61 has a frame or body member 105 mounted upon bracket portion 58 in spaced relation to rapid traverse bracket 60 and motor 59, as shown in FIG. 2. Frame or case member 105 is of generally ring-shape and has a radially inwardly projecting flange 108 adjacent one end thereof. Retaining ring 109 secured to case 105 serves to form a retaining flange opposite flange 108 at the second end of case 105. A rotatable assembly or turret portion is mounted in the frame 105 between flange 108 and retaining ring 109. The turret assembly has round, disc-like end frames 106 and 107 secured in parallel spaced relation to each other by means of turret studs 110. Each of the turret studs 110, as shown in FIG. 2, has a central cylindrical shoulder portion 111 having radial end faces from which threaded stud portions 112 of smaller diameter extend coaxially. The end faces of shoulder portions 111 are disposed between and in co-operative abutment with the inwardly facing, opposed faces of end plates 106 and 107, thereby maintaining the end plates in parallel, predetermined spaced relation. Nuts 113, in threaded cooperative relation with threaded stud portions 112, are drawn up to clamp the respective end plates 106 and 107 firmly against the radial end faces of the shoulders 111. To effect angular rotation of the rotatable turret assembly, of which end plates 106 and 107 constitute the principal frame portions, into a desired position within and relative to feed turret frame 105, a worm 124 and worm wheel 128 are provided. Worm 124 is mounted upon worm drive shaft 125 to which it is coupled by key 126 for rotation in unison therewith. Means (not shown) are provided to secure worm 124 against movement longitudinally of shaft 125. Shaft 125 is journaled for rotation in support bearings which may be provided in fixed relation to feed turret body 105 and frame 50 as shown in FIG. 26. Shaft 125 is thus supported for rotation about a predetermined axis and secured against axial displacement along that axis by means such as stop collars 160, 161, respectively secured to shaft 125 by taper pins 162 and 163. Collars 160, 161 cooperate with an intervening portion of frame 50, as shown in FIG. 26. Worm 124 is thus supported in a predetermined location relative to case or frame member 105 and in engagement with teeth 129 of worm wheel 128. End plate 106 is provided with an axially, outwardly extending, annular spacing collar or boss 127 which is secured in fixed relation thereto and to worm wheel 128 by any suitable means, such as keys, welds, screws, bolts, or the like, not shown. Worm wheel 128 is mounted in coaxial relation to end plates 106 and 107. Worm wheel 128 has radially projecting peripheral teeth 129 adapted to cooperatively engage thread 130 of worm 124. Rotation of worm 124 effects rotation of the rotatable assembly including end plates 106 and 107 within turret case or frame 105.

As shown most clearly in FIG. 2, a pair of aligned axial bores are provided in end plates 106 and 107 and bearing inserts 114 are provided therein. Turret input or driving shaft 115 is journaled for rotation in bearings 114. Turret input or driving sprocket 116 and turret input or driving gear 117 are mounted upon and respectively coupled to shaft 115 for rotation in unison therewith by keys 118 and 119, and set screws 120 and 121. As shown in FIG. 2, grease or oil seals 122 and 123 may be provided in sealing cooperation with end plates 106 and 107, respectively, and shaft 115.

Power from motor 59 may be applied to turret input or drive shaft 115 through sprocket 63, chain 70, sprocket 69, shaft 68, sprocket 71, turret drive chain 116c, and driven sprocket 116. Thus, whenever motor 59 is in operation, the turret drive shaft 115 rotates in the same direction as motor shaft 62 and the turret driving gear 117 rotates in unison with shaft 115 to drive the turret gear train. The details and arrangement of the power transmitting gear train of turret 61 are shown most clearly in the generally schematic view, FIG. 3.

Figure 3:
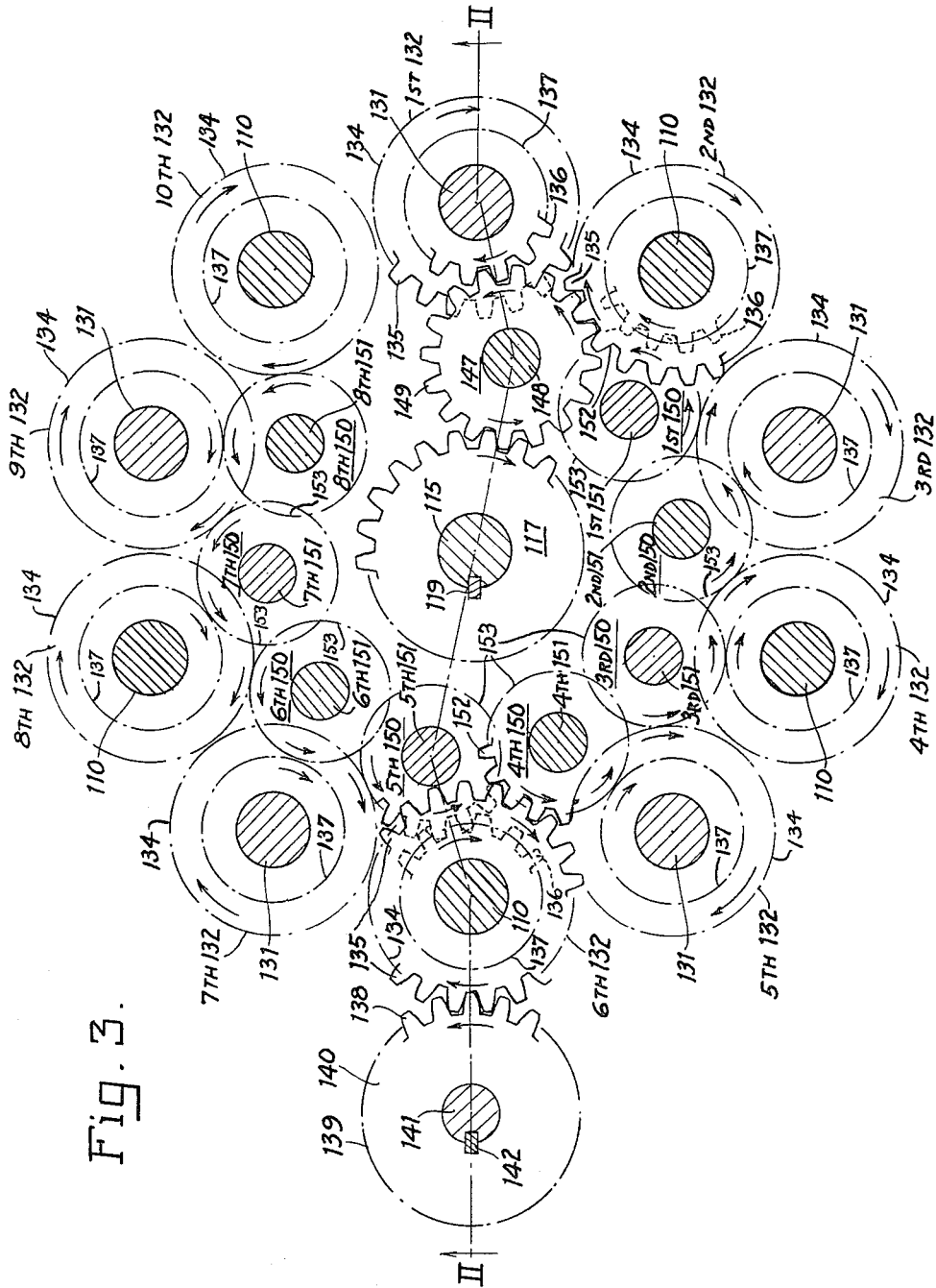
FIG. 3 is a generally schematic view in vertical section of the feed turret gear train of the machine.

As shown in FIG. 3, the rotatable turret 61 has a plurality of shafts which are parallel to studs 110 which serve as shafts. As previously explained, turret driving shaft 115 extends axially through end plates 106 and 107. An outer row of nonrotating shafts, ten in number, are regularly spaced and equidistant from the axis of shaft 15. As indicated, five of these shafts are the turret studs 110, specifically the central portions 111 thereof. The alternate, intervening shafts in the outer circle comprise pins 131 cooperatively supported by end plates 106 and 107, in which respective pairs of aligned apertures are provided. Suitable means, such as set screws 133 (FIG. 2) may be provided in threaded cooperation with one of the end plates, such as plate 106 and each adapted to preclude axial shifting of one of the shafts 131. Shafts 131 may be hardened dowel pins of the same diameter as the shoulder portions 111 of turret studs 110. Ten compound gears 132, severally further identified by the reference characters FIRST, SECOND, THIRD, FOURTH, FIFTH, SIXTH, SEVENTH, EIGHTH, NINTH, and TENTH, respectively, are journaled on the shafts 131 and 110, as shown in FIGS. 2 and 3, for free rotation relative to the respective shafts. Each of the compound gears 132 comprises a first or larger diameter portion having twenty teeth 135 on pitch circle 134. The second or smaller diameter portion of compound gear 132 has fourteen teeth 136 on pitch circle 137. In assembling the turret, the compound gears 132 are placed on the shafts 110 and 131 so that when viewed as in FIG. 3, the portion of gear 132 having pitch circle 134, is remote from the observer on every other shaft, for example, on all shafts 131, while those on the intervening shafts 110 are placed with the portion having the pitch diameter 134 nearest to the observer. To further illustraate this point, assume that the sectional view of the turret 61 forming part of FIG. 2 is taken along the section line indicated in FIG. 3, as II—II. The compound gears 132 journaled for rotation upon shafts 131 are placed in the position in which the gear 132 on shaft 131 is illustrated in FIG. 2. All of the gears 132 journaled for rotation on the shafts 110 are in a position corresponding to the position of gear 132 on shaft 110 in FIG. 2. Thus, on each shaft 131 the portion of compound gear 132 having pitch circle 134 is adjacent end plate 107 and the portion having pitch circle 137 is adjacent end plate 106. The compound gears 132 journaled for rotation upon the turret studs or shafts 110 are placed with the portion of the gear having the pitch circle 134 adjacent end plate 106 and the portion having the pitch circle 137 adjacent end plate 107. The portions of compound gears 132 adjacent each of the end plates are alternately of large and small pitch diameter. The gears 132 do not mesh with each other. It will be noted that inasmuch as each of the shafts in the outer circle of shafts, namely, shafts 110 and 131, are radially spaced an equal distance from the axis of shaft 115, the teeth 135 on the portion of each compound gear 132 lying along the respective pitch circle 134 will properly mesh with the teeth 138 lying on pitch circle 139 of turret output gear 140, when the axis of its shaft 110 or 131 is coplanar with the axial plane of shafts 115 and 141, shaft 141 being the shaft upon which gear 140 is mounted and to which it is keyed by key 142. It is to be noted that gear 140 has an axial dimension substantially equal to that of compound gear 132. As shown in FIG. 2, shaft 141 is journaled for rotation in turret frame or case 105, and turret output sprocket 143 is mounted thereon for rotation in unison therewith in cooperative relation to frame 105. Key 144 cooperatively couples shaft 141 and sprocket 143 while set screw 145 serves to preclude axial displacement of shaft 141 relative to output sprocket 143. A stop collar 146 threadedly engages shaft 141 adjacent its end remote from output sprocket 143. Collar 146 may be rotated relative to shaft 141 to position it for cooperative engagement with frame 105, collar 146 and sprocket 143 being spaced to limit longitudinal displacement or end play of shaft 141 to a magnitude falling within tolerance limits. Set screw 146a is provided to lock stop collar 146 in such position of adjustment longitudinally of shaft 141.

Turning again to the gear train of the turret, a driving idler gear 147 is journaled for rotation upon shaft 148 positioned so that teeth 149 of idler gear 147 are in constant proper mesh with turret input or driving gear 117, the teeth 136 lying on pitch circle 137 of compound gear FIRST 132 and the teeth 135 lying upon pitch circle 134 of compound gear SECOND 132. As shown, turret driving gear 117 has twenty-one teeth, and idler gear 147 has sixteen teeth. The idler gear 147 meshes with the fourteen teeth on pitch circle 137 of the compound gear FIRST 132 and the twenty teeth on pitch circle 134 of the compound gear SECOND 132. Idler gear 1st 150, journaled for rotation upon idler shaft 1st 151, has fourteen teeth 152 on pitch circle 153. The teeth 136 lying on pitch circle 137 of compound gear SECOND 132, mesh in driving relation with the teeth 152 lying on the pitch circle 153 of idler gear 1st 150. The teeth 152 of idler gear 1st 150 also mesh with the teeth 135 lying on pitch circle 134 of compound gear THIRD 132. In a similar manner compound gear THIRD 132 drives idler 2nd 150 which, in turn, drives compound gear FOURTH 132 which drives an idler 3rd 150 which, in turn, drives the compound gear FIFTH 132 and the latter drives an idler 4th 150, which, in turn, drives the compound gear SIXTH 132, which, as shown in FIG. 3, is in mesh with and drives turret output gear 140. Each of the subsequent compound gears SEVENTH 132, EIGHTH 132, NINTH 132, and TENTH 132 is driven through a respective meshing idler 5th 150, 6th 150, 7th 150, or 8th 150 by the preceding compound gear 132 in the train, and in turn, drives the following compound gear through another idler gear 150. Thus, the compound gears 132 and the turret driving gear 117 all rotate in like direction, as shown by the arrows in FIG. 3. For purposes of illustration, an arrow has been placed on the representation of each of the gears adjacent the portion which is in cooperative engagement with another gear in the gear train illustrated in FIG. 3 to indicate the direction of rotation of each gear corresponding to the indicated particular direction of rotation of each of the other gears in the train. The arrows are not intended to indicate that the respective gears rotate in only one direction. The feed drive motor 59 is preferably one which may be operated to drivingly rotate its shaft 62 in clockwise or in counterclockwise direction, as previously explained. Reversal of the direction of rotation of the motor shaft 62 will effect a corresponding reversal of the direction of rotation of any particular gear in the gear train illustrated in FIG. 3. There are eight idlers 150 respectively, further designated 1st, 2nd, 3rd, 4th, 5th, 6th, 7th, and 8th. Each idler 150 is journaled for rotation on a respective shaft 151. The axes of shafts 151 are equally spaced radially from the axis of shaft 115 and each is angularly spaced 36 degrees of arc from the shaft of 1st idler 150 as shown in FIG. 3. Further, the idlers 150 are of an axial dimension no greater than one-half the axial dimension of gears 132. The even numbered, i.e., 2nd, 4th, 6th, and 8th idlers 150 being positioned adjacent end plate 106 similar to the positioning of driving idler 147 in FIG. 3. The odd-numbered, i.e., 1st, 3rd, 5th, and 7th idlers 150, like 5th idler 150, are disposed adjacent end plate 107 as shown in FIG. 3.

Rotation of worm 124 in cooperative relation with the teeth of worm wheel 128 effects rotation of end plates 106, 107 and the portions of the assembly supported thereby relative to the frame or turret case 105 in which the end plates are mounted. Thus, by appropriate rotation of worm 124 any desired compound gear 132 may be moved into appropriate meshing engagement with turret output gear 140, teeth 135 of the former cooperating with teeth 138 of the latter when the axes of their shafts are coplanar with the axis of shaft 115.

The compound gear FIRST 132 rotates faster than SECOND 132 and each succeedingly numbered gear 132 rotates more slowly than the one of next lower number and the TENTH gear 132 rotates lowest of all of the gears 132. Further, all gears 132 rotates in like direction at any given time and shifting the turret to engage a different gear 132 with gear 140 alters the speed of rotation of gear 140, but not its direction of rotation. All gears 132 shown in the drawing rotate at a speed such that drive shaft 77 is, through turret outside sprocket 143, turret output drive chain 154, feed-clutch sprocket 83, and feed clutch 85, driven at a slower speed of angular rotation and in opposite direction to the rotation of shaft 68, when feed clutch teeth 84 and 87 are in cooperative engagement.

From the foregoing description, it may be noted that when motor shaft 62 rotates in a given direction, which may be referred to as clockwise rotation, the final drive sprocket 78 will rotate in like direction when the rapid traverse clutch having plates 74 and 88 is engaged and shafts 77 and 68 will rotate in unison. Further, if shaft 68 is rotated at the same speed and in the same direction when the feed drive clutch 85 is engaged with feed clutch sprocket 83, namely, when teeth 87 and 84 are in cooperating relation, final drive sprocket 78 will rotate more slowly in the opposite direction, at any one of ten speeds, corresponding to the particular compound turret gear 132 which is then in driving relation to turret output gear 140. In order that the operator may conveniently and positively move any desired compound turret gear 132 into driving relation to turret output gear 140, turret indexing means are provided. As shown in FIG. 26, the turret indexing means has a crank handle 164 secured to shaft 165 for rotation in unison therewith. Shaft 165 is supported for rotation in frame 50. Stop collars 166, 167 are secured to shaft 165 by taperpins 166a, 167a, respectively, and cooperatingly engage frame 50 to preclude axial shifting of shaft 165. Transfer shaft 336 is supported for rotation in bearing bracket 337 secured in fixed relation to frame 50 and feed turret frame or body 105. Universal coupling 253 connects shafts 165 and 336 for rotation in unison. A pair of bevel gears 351, 352 are respectively secured to shafts 336 and 125 by which they are supported and with which they rotate in unison while in cooperative meshing engagement. Thus swinging of crank 164 effects corresponding rotation of worm 124 and turret end frames 106, 107 and the structure supported thereby to move compound gears 132 relative to gear 140. Crank handle 164 has one knob 375 secured to a pin 376 supported for axial reciprocation in crank handle 164 in spaced parallel relation to shaft 165 and spring biased to advance toward guard 377 secured to frame 50. Pin 376 is received in an indexing aperture in guard 377 to lock crank handle 164 against rotation in a position corresponding to co-operative engagement of one of the compound gears 132 with turret output gear 140. Thus, to rotate turret end frames 106, 107 one-tenth ($\frac{1}{10}$) of a revolution and move one compound gear 132 out of engagement with gear 140 and an adjacent compound gear 132 into mesh with turret output gear 140, pin 376 may be retracted, disengaged from guard 377, crank 164 swung through one revolution, and pin 376 reengaged in guard 377. As shown in FIG. 26, a cup or drum-shaped dial 378 is supported for rotation on shaft 165 between crank 164 and frame 50. A dial driving gear train is housed in the dial 378 and comprises a shaft gear 379 secured on shaft 165, at least one idler or transfer gear 417 supported by stub shaft 418 supported by frame 50, and inwardly projecting teeth 419 provided on dial 378. The gear train represented by gears 379, 417 and 419 is adapted to rotate dial 378 one-tenth of a revolution for each revolution of shaft 165. The cylindrical surface 378s of dial 378 has appropriate indicia provided thereon, for example, notations of the ten different speeds of table feed, located on the dial with respect to dial position corresponding to the particular position of the end frames 106, 107. Guard 377 serves with frame 50 to bound a dial viewing aperture through which the appropriate indicia of table feed speed on dial 378 is visible when a particular compound gear 132 is positioned in engagement with gear 140, and crank 164 is locked against rotation by engagement of pin 376 with guard 377, as shown in FIG. 26.

As shown in FIG. 2, final drive sprocket 78 is in constant operative engagement with final drive chain 170 which, as shown, may be a three-strand silent roller chain. Chain 170 is also trained in driving relation to and over driven feed sprocket 171 (FIG. 4) and column feed sprocket clutch 172 (FIG. 8).

As shown in FIG. 4, horizontal portion 173 of frame 50 supports inside kickout bracket 174 secured thereto by suitable means, such as screws or bolts 175. A pair of aligned bearing sleeves or bushings 176 and 177 are respectively mounted in apertures provided in inside kickout bracket 174 and the front wall of frame 50. Feed shaft 178 is journaled in bearings 176 and 177 for angular rotation and as shown may extend through suitable oversize apertures provided in portions of frame 50 through which it extends as at 179. Driven feed sprocket 171 mounted upon feed shaft 178 is secured thereto for rotation in unison therewith by means such as taper pin 180. Sprocket wheel 171 may also cooperate with bearing sleeve 176, or other suitable thrust bearing member cooperating with inside kickout bracket 174 for limiting axial movement of feed shaft 178 longitudinally toward inside kickout bracket 174. To preclude axial axial movement of feed shaft 178 in the opposite direction, namely, away from bracket 174, feed shaft stop collar 181 may be secured in fixed relation to feed shaft 178 by suitable means such as set screw 182 for cooperative engagement with frame 50 or other suitable thrust bearing surface as shown in FIG. 4. Feed gear 183 is also mounted upon feed shaft 178 and secured thereto by means such as taper pin 184 for rotation in unison therewith. As shown in FIG. 4, a transfer or idler shaft 185 may be provided in spaced parallel relation to feed shaft 178 and journaled in sleeve bearings 186 and 187 mounted in suitable apertures provided in frame 50. Stop collar 188 and idler gear 189 are mounted upon idler shaft 185 and by set screws 190 and 191 are respectively secured to that shaft 185 for rotation in unison therewith. As shown in FIG. 4, the collar 188 and idler gear 189 may be secured to shaft 185 in spaced positions to substantially preclude axial shifting of the shaft relative to frame 50. Idler gear 189 is in constant mesh with and driven by feed gear 183. Idler gear 189, in turn, is in continuous driving engagement with feed clutch gear 192. Feed clutch gear 192 is mounted upon inner telescoping shaft 193, key 194 and set screw 195 serving to lock them together for rotation in unison while precluding axial displacement of one relative to the other. Inner telescoping shaft 193 is journaled for rotation in bearings 196. As shown in FIG. 4, a collar or washer 197 may be interposed between an annular shoulder 169 on shaft 193 and an opposed radial face of bearing 196 to preclude axial displacement of the inner telescoping shaft 193 toward the left of the position in which it is shown in FIG. 4. In a similar manner, feed clutch gear 192 has a radial face adapted to cooperate with an opposed radial face of the adjacent or second bearing 196 precluding axial displacement of telescoping shaft 193 toward the right of the position in which it is shown in FIG. 4. Inner telescoping shaft 193 is hollow or tubular in form and saddle or cross feed screw 198 extends axially therethrough into threaded engagement with saddle nut 199 secured in fixed relation to saddle 200 by means such as screws 201.

Saddle 200 is mounted upon ways 202 (shown in FIG. 1) for reciprocation parallel to cross feed screw 198.

As shown in FIG. 4, a bushing 203 may be provided in inner telescoping shaft 193 adjacent its end remote from feed clutch gear 192, the bushing also cooperating with cross feed screw 198, as illustrated. Cross feed screw 198 is journaled for rotation in bearings 204 supported by frame 50. The portion of cross feed screw 198 extending through the bearings 204 may be of reduced diameter to provide an adjacent radial face 208 adapted to cooperate with an abutting radial face of the bearing 204 to preclude axial displacement of cross feed screw 198 toward the left of the position in which it is illustrated in FIG. 4. To preclude axial displacement of the cross feed screw shaft 198 toward the right of the relative position in which it is shown in FIG. 4, cross feed screw dial clutch bushing 205 keyed to shaft 198 by key 206, may be adjusted axially along shaft 198 toward radial shoulder face 208 until it is held in thrust transmitting cooperative relation with the adjacent opposed radial face of the sceond bearing 204, by cross feed screw thrust nut 207 in cooperative engagement with threads 209 on shaft 198. Nut 207 may be positioned on shaft 198 to eliminate end play from cross feed screw shaft 198. Suitable locking means such as a set screw or lock nut (not shown) may be provided for securing cross feed screw thrust nut 207 in fixed relation to screw shaft 198 when these parts are in the desired relationship of adjustment.

As shown in FIG. 4, cross feed screw shaft 198 may extend to the left of the threads 209 thereon engaged by thrust nut 207 which leftwardly extended portion is designated 210. Hand wheel 211 is mounted upon portion 210 of cross feed screw shaft 198 for reciprocation axially thereof and for rotation relative thereto when in the position illustrated in FIG. 4. Hand wheel 211 may have integral clutch elements, or, as shown in FIG. 4, may be provided with an integral hub portion 212 upon which clutch ring 213 is mounted in coaxial relation with shaft portion 210. Suitable means, such as set screw 214, are provided and adapted to cooperate with hub 212 for securing the clutch ring 213 in fixed relation to hand wheel 211. Clutch teeth 215 provided on clutch ring 213 are adapted to cooperate with clutch teeth 216 on cross feed screw dial bushing 205. When hand wheel assembly 211–213–214 is advanced toward the right from the position illustrated in FIG. 4, into the position in which the teeth 215 and 216 will meshingly engage, hand wheel 211 and cross feed shaft 198 are coupled for rotation in unison.

A stop washer or member 217 may be secured to the end of cross feed screw shaft 198 by means of screw 218 to provide stop means adapted to preclude movement of hand wheel 211 leftwardly beyond the position in which it is shown in FIG. 4. Rotation of screw 198, secured against axial displacement relative to frame 50 and in cooperation with saddle nut 199, effects movement of saddle 200 upon its ways parallel to the axis of the cross feed screw shaft 198. Reversal in the direction of rotation of the cross feed screw 198 works a corresponding reversal in the direction of movement of saddle 200 longitudinally of its ways.

Cross feed clutch 220 is mounted upon cross feed screw shaft 198 for reciprocation longitudinally thereof and is keyed thereto by key 221 which serves to lock members 220 and 198 together for rotation in unison. Cross feed clutch member 220 has clutch teeth 222 adapted to cooperatively mesh with clutch teeth 223 of feed clutch gear 192. To effect shifting of cross feed clutch 220 into and out of engagement with feed clutch 192, I provide a shifter shaft 224, as shown in FIGS. 4 and 19. Shifter shaft 224, is mounted for longitudinal reciprocation in suitable bearings provided in inside kickout bracket 174 and in frame 50 adjacent to bearing 177 in which feed shaft 178 is journaled. Shifter shaft 224 extends parallel to feed shaft 178, as shown. It may be noted in FIG. 19, that a portion of shifter shaft 224 is broken away and indicated by dashed lines. A shifter fork 225 is mounted upon shifter shaft 224 to which it is secured in fixed relation by set screw 226. As shown in FIG. 4, shifter fork 225 extends into annular groove 227 provided in cross feed clutch 220. This cooperative relation places cross feed clutch 220, shiftable longitudinally along cross feed screw shaft 198, under control of fork 225. Shifter rack teeth 228 are provided on shifter shaft 224 engaged by the teeth of shifter pinion 229 the shank 230 of which is journaled for rotation in base 50 as shown in FIG. 19. Shifter lever 231 is secured to the shank 230 of pinion 229 by means of set screw 232. Swinging of shifter lever 231 effects corresponding rotation of pinion 229 which, through its cooperative engagement with rack teeth 228, effects longitudinal reciprocation of shifter shaft 224 and fork 225, to move cross feed clutch 220 into or out of cooperating engagement with feed clutch gear 192. As shown in FIG. 1, clutch shifter lever 231 projects forwardly and upwardly to its free end. When its free end is raised from the position shown in FIG. 1, pinion 229 shown in dash lines in FIG. 4, will rotate in a clockwise direction as there shown. Clockwise rotation of pinion 229 as viewed in FIG. 4 will produce longitudinal reciprocation of shifter shaft 224 to the right of the position in which it is shown in FIG. 4, which movement will be accompanied by corresponding movement of shifter fork 225 in unison therewith. Thus, sufficient upward movement of the free end of shifter lever 231 will result in movement of cross feed clutch teeth 222 into meshing cooperating engagement with clutch teeth 223 of feed clutch gear 192 when feed clutch gear 192 is rotating in response to forces supplied by feed drive motor 59 and applied through the intervening mechanism previously described. Engagement of clutch teeth 222 and 223 results in rotation of feed clutch gear 192 and feed clutch 220 in unison with cross feed screw shaft 198 to effect power cross feed or movement of saddle 200 along its ways in a direction corresponding to the direction of rotation of feed screw 198.

In order to preclude advancement of saddle 200 beyond predetermined limits, an automatic kickout mechanism may be provided.

A plurality of kickout rack teeth 233, provided on shifter shaft 224, are adapted to cooperatively engage the teeth of kickout pinion 234. Kickout pinion 234 is mounted upon kickout shaft 235 which extends horizontally at right angles to shifter shaft 224. Kickout shaft 235 is journaled for rotation in inside kickout bracket 174 and outside kickout bracket 236 and extends through a clearance aperture provided in base 50 at 237. Kickout pinion 234 is secured to kickout shaft 235 by means such as taper pin 238 and stop collar 239 is secured to kickout shaft 235 by set screw 240. Pinion 234 and collar 239 respectively cooperate with inside kickout bracket 174 to preclude axial displacement of kickout shaft 235 from the position in which it is shown in FIG. 19. Outside kickout bracket 236 shown in FIGS. 1 and 19, serves as the outer support bearing for kickout shaft 235 and as a housing for kickout pinion 241 mounted upon shaft 235 for rotation in unison therewith by means such as taper pin 242. Outside kickout bracket 236 has a bore extending at right angles to the bore in which kickout shaft 235 is journaled for rotation. A kickout pin 243 is mounted for reciprocation in the bore extending at right angles to shaft 235 and has a plurality of rack teeth positioned for cooperative engagement with the teeth of kickout pinion 241. Kickout pin 243, as shown in FIG. 1, projects upwardly from outside kickout bracket 236 toward the underside of saddle 200. The upper end portion of kickout pin 243 being preferably wedge-shaped, is tapered to edge 244. As shown, edge 244 is substantially horizontal and extends perpendicularly to the path of travel of saddle 200. A pair of saddle travel limit cams 155, 156 are provided and adapted to be secured in fixed relation to saddle 200 as desired by means of bolts 157 shown in FIG. 19 which cooperate with T-slot 158 shown in FIG. 1. Cams 155, 156 are adapted to cooperate with the inclined faces 245 and 246, respectively, of the wedge-shaped portion of kickout pin 243. Cams 155, 156 may be secured in fixed relation to saddle 200 for cooperative engagement with kickout pin 243 adjacent desired limit positions of saddle 200. When the kickout cams are so adjusted and secured to saddle 200, the movement of the saddle toward the predetermined limit of movement at either end of its path of travel, will result in the respective cam engaging and cooperating with face 245 or 246 and forcing kickout pin 243 downwardly into outside kickout bracket 236. This movement of kickout pin 243 effects corresponding unison rotation of pinions 241, 234, and kickout shaft 235, longitudinal shifting of shifter shaft 224 from the position in which its one end is flush with the outer face of base 50, as illustrated in FIG. 19, toward the projecting position in which it is illustrated in FIG. 4. This reciprocation of shifter shaft 224 is accompanied by downward swinging motion of the free end of shifter lever 231 into the position corresponding to the disengaged position of power cross feed clutch 220.

Saddle 200 may be mounted upon the base ways in the usual manner utilizing gibs (not shown) which may be adjusted to and secured in positions, which result in elimination of play between the table and the base ways.

Saddle 200 may be provided with a suitable binder lock actuatable by hand lever 247 (FIG. 1) by means of which the saddle 200 may be locked in fixed position relative to base 50 as desired.

As shown in FIG. 4, a suitably calibrated dial ring 219 may be mounted upon dial bushing 205 for rotation in unison with dial bushing 205 and the associated cross feed shaft 198. A suitable index mark 248 may be provided upon base 50 adjacent dial ring 219. Means, such as a compression loading set screw 249, compression spring 251, and retaining ball 250 may be provided, for cooperating with conic face 252 provided on dial bushing 205 to urge ring 219 toward the left as it is shown in FIG. 4. Easy adjustment of dial ring 219 relative to bushing 205 is permitted by this structure in order that a particular reference indicia upon the dial ring may be brought into desired relationship with the index mark 248 to indicate a particular position of the saddle 200 upon its ways. Ring mounting means 249, 250 and 251 after such setting adjustment, secure dial ring 219 in fixed relation to bushing 205 and cross feed shaft 198 until further adjustment is desired.

Inner telescoping tube 193, as shown in FIG. 4, has a key way in its outer face in which key 255 is secured. An internal key way 254 adapted to cooperatively receive key 255 is provided in the outer telescoping shaft 256 whereby the key 255 serves to lock inner telescoping shaft 193 and outer telescoping shaft 256 for rotation in unison, while permitting axial reciprocation of outer telescoping shaft 256 relative to the inner telescoping shaft 193. It may be noted that inner telescoping shaft 193, as previously explained, is secured against axial displacement relative to frame 50. To preclude axial reciprocation of outer telescoping shaft 256 into a position in which it is out of engagement with key 255 and thus into disconnected relationship to inner telescoping shaft 193, a longitudinally or axially oriented groove 257 may be provided on the exterior surface of shaft 193 and a stop pin 258 in engagement with outer telescoping shaft 256 may extend into groove 257 and is adapted to cooperate with the end walls of groove 257 to preclude axial movement of shaft 256 beyond the preferred limits of its movement relative to shaft 193. Outer telescoping shaft 256 extends through driving feed gear sleeve 259 relative to which it is axially reciprocable and to which it is keyed by key 260. Key 260 is disposed in key ways provided in outer telescoping shaft 256 and driving feed gear sleeve 259.

As shown most clearly in FIG. 4, a stop pin 261 is provided in outer telescoping shaft 256 adjacent the end thereof remote from stop pin 258. Driving feed gear sleeve 259 is free to move longitudinally relative to outer telescoping shaft 256 between the limits established by stop pins 258 and 261 which it engages in the limit positions of displacement. Driving feed gear sleeve 259 is journaled for rotation in bearing pedestals 262 and 263 formed integrally with feed gear bracket 264. Bracket 264 is secured to saddle 200 by suitable means such as screws or bolts 265. As shown in FIG. 4, the driving feed gear sleeve 259 has an annular shoulder adjacent one of its ends and against which one radial face of driving feed gear 266 abuts. Driving feed gear 266 and sleeve 259 are coupled by key 267 and rotate in unison. A thrust washer 268 may be disposed annularly of driving feed gear sleeve 259 and interposed between driving feed gear 266 and feed gear bracket pedestal 263. A second thrust washer 269 may be provided annularly of driving feed gear sleeve 259 and interposed between feed gear bracket bearing pedestal 263 and thrust nut 270 which is in cooperative engagement with external threads 271 provided upon driving feed gear sleeve 259 remote from the shoulder portion against which driving feed gear 266 abuts. As shown in FIG. 4, suitable bearing bushings 272 and 273 may be provided in bearing pedestals 262 and 263, respectively. As shown in the drawings, driving feed gear 266 is preferably a spiral gear having teeth 274 lying on a pitch circle 274c. Spiral driven feed gear 275 is mounted upon driven feed clutch shaft 276 and its spiral teeth 277 are in mesh with the spiral teeth 274 of driving feed gear 266. As shown in FIG. 5, feed gear 275 is secured to driven clutch shaft 276 by means such as taper pin 278 for rotation in unison therewith. Driven clutch shaft 276 is journaled for rotation in bearing 279 mounted in a bearing seat provided in saddle 200 and in a pair of spaced bearing pedestals 280 and 281 provided integrally in feed gear bracket 264, and as shown in FIG. 5, bearing bushings 282 and 283 may be provided in pedestals 280 and 281, respectively. It may be noted that suitable thrust washers may be provided between driven spiral feed gear 277 and the adjacent bearing pedestals 280 and 281, the washers being designated by the reference characters 284 and 285 in FIG. 5. Shaft 276, preferably extends from driving gear 277 through bearing 279 into cooperative relation with driving clutch member 286 which is secured to it by means such as taper pin 287. A bushing-like bearing member 288 is mounted in a recess provided in driving clutch 286 and serves as one of the journal bearings for feed shaft 289. As shown, a second journal bearing 290 is provided for feed shaft 289, the bearing 290 being supported in fixed relation to saddle 200. Driven clutch 291 is mounted for axial reciprocation along feed shaft 289 and secured for rotation in unison therewith by key 292. As shown, an annular groove 293 is provided in driven clutch member 291 adapted to cooperatively receive clutch shifter fork 294 which, in turn, is pivotally mounted upon clutch shifter crank 295. As shown in FIGS. 5 and 6, driving clutch member 286 and driven clutch member 291 are provided with axially projecting engageable clutch teeth 296 and 297, respectively. A gear 298 is mounted upon shaft 289 and secured in fixed relation thereto for rotation in unison therewith by key 299 and set screw 300. Gear 298 is disposed in meshed engaging relation with hand wheel shaft driving gear 301 shown in dot-dash lines in FIG. 5 and in full lines in FIG. 7. It may be noted that FIG. 5 is taken upon a section plane spaced to the rear of the section plane upon which FIG. 7 is taken. With particular reference to FIGS. 1 and 7, hand wheel brackets 302 and 303 are respectively mounted on opposite ends of saddle 200. A table feed hand wheel shaft 304 is journaled in bearing members 305 and 306, respectively mounted in saddle 200 and hand wheel bracket 302, in coaxial alignment as shown in FIG. 7. Shaft 304 has an enlarged shoulder portion 307 disposed between bearing members 305 and 306 and the portions supporting them, a construction which serves to preclude axial displacement of hand wheel shaft 304 relative to saddle 200. Hand wheel shaft driving gear 301 in constant mesh with and driven by feed shaft gear 298 is mounted upon shoulder portion 307 of hand wheel shaft 304 and keyed thereby by key 308 for rotation in unison therewith whereby hand shaft 304 may be driven. A second table feed screw shaft driving gear 309 is mounted upon shaft shoulder 307 adjacent gear 301 and, like the latter, is keyed to shaft 304 by the key 310 for rotation in unison therewith. As shown in FIG. 7, a suitable spacing collar 311 may be provided on shaft 304 to preclude substantial axial displacement of gears 301 and 309 along shaft 304. Table feed screw shaft 312 extends through saddle 200 and is journaled thereon in antifriction bearings supported in the ends of saddle 200. As shown in FIG. 7, a shield 314 and a seal 315 cooperate with portions of saddle 200 adjacent bearing 313 to form a protective housing or enclosure therefor. Table feed shaft 312, as shown in FIG. 7, extends successively through seal 315, bearing 313, shield 314, table feed screw gear 316, thrust nut 317 and lock nut 318. A portion of table feed shaft 312 has threads 319 which are cooperatively engaged by the nuts 317 and 318. Table feed shaft gear 316 is secured for rotation in unison with screw shaft 312 by key 320 and is in mesh with screw shaft driving gear 309 mounted upon hand wheel shaft 304. Thus rotation of hand wheel shaft 304 effects, through gears 309 and 316, rotation of table feed screw shaft 312.

To effect hand rotation of shaft 304, dial bushing clutch element 321 is mounted concentrically thereon secured for rotation in unison therewith by key 322 and against reciprocation axially along shaft 304 by thrust nut 323 in threaded engagement with shaft 304 and disposed in an axial recess provided in dial bushing clutch member 321. A set screw 324 may be provided, adapted to cooperate with members 321 and 323 to secure them in fixed, relative relationship. Hand wheel or crank 325 is mounted for free rotation upon shaft 304 adjacent the outer or free end portion thereof. An annular ring-like clutch member 326 is mounted upon and secured to crank 325 by means such as set screw 327 in concentric relation with shaft 304. The integral clutch teeth 328 provided upon clutch element 326 and the integral clutch teeth 329 provided upon dial bushing element 321 project axially and are adapted to cooperate for coupling crank 325 to shaft 304 whereby manual swinging of crank 325 will effect rotation of shaft 304 and a corresponding rotation of table feed screw shaft 312. Crank 325 is mounted for axial reciprocation along shaft 304, one limit of its path of reciprocation being in the position of full engagement with feed dial bushing clutch element 321 and the other limit of its reciprocation being provided by crank retaining stop washer 330 secured against the end face of shaft 304 by mounting screw 331. As shown in FIG. 7, when crank clutch teeth 328 are disengaged from clutch teeth 329, crank 325 will hang substantially motionless in the position illustrated in FIG. 7, even though hand wheel shaft 304 is rotating incident to power rotation of table feed screw 312. Table feed screw dial bushing clutch element 321 is similar to the saddle feed bushing clutch element 205 and is adapted for cooperation with a ring-shaped table feed dial 332 secured in manually adjustable relationship relative thereto by means of set screw 333 and sphere member 334. The table feed dial ring 332 may be rotated manually relative to bushing 321 to place indexing marks thereon in desired relationship to indexing marks provided upon hand wheel bracket housing 302, adjacent ring 332. Table feed dial ring 332, once set, will remain in fixed relation to dial bushing 321 until it is subsequently reset manually. The view, FIG. 7, is taken in section through hand wheel bracket 302 and adjacent portions of the cooperating structure located at the far end of saddle 200 of the machine embodying this invention as illustrated in FIG. 1. However, a similar structure is provided at the opposite end of saddle 200 and the view shown in FIG. 7 would correspond with a similar sectional view taken through hand wheel bracket 303, except that in the latter view gear 301, shaft 289 and gear 298 would not appear as the table feed screw shaft is power fed only through the structure illustrated in FIG. 7.

As may be understood, the structure previously described, will produce rotation of table feed clutch driving member 286 whenever final drive sprocket 78 is rotating, there being a continuous mechanical connection provided between those members. Thus to apply power from motor 59 to effect rotation of cross feed screw shaft 312, clutch teeth 296 and 297 of the clutch members 286 and 291, respectively, must be moved into meshing engagement, and will continue so long as that engagement is maintained and power is supplied from motor 59 through sprocket 78. To control movement of clutch element 291 into and out of meshing engagement with the cooperating driving clutch element 286, an annular groove 293 is provided therein. Clutch shifter fork 294 projects into groove 293, as shown in FIGS. 5 and 6, and, in turn, is pivotally mounted upon clutch shifter crank 295. It may be noted that shifter fork 294 has a cylindrical shank 338 which cooperates with clutch shifter crank 295 to permit pivoting of shifter fork 294 relative to the crank, whereby it may remain in proper alignment with groove 293. As shown in FIG. 6, clutch shifter crank 295 is mounted upon clutch crank stud 339 about which it may pivot or rotate or which retains it in substantial abutment with saddle 200, against and by which it is supported. A clutch lever fork 340 has a cylindrical shank 341 in pivotally cooperating relation with shifter crank 295. Clutch lever fork 340 and its unitary shank 341 may pivot about an axis substantially parallel to the axis about which clutch shifter fork 294 and its integral shank 338 pivot. Clutch lever stem 342 is journaled in a bore provided in a portion of saddle 200. Table feed clutch hand lever 343 is secured in fixed relation to clutch lever stem 342, the former cooperatively abutting saddle 200 to preclude axial displacement of clutch lever stem 342 toward clutch crank stud 339. A retaining ring 344 is provided in cooperative engagement with clutch lever stem 342, a portion of the retaining ring being received in an external annular groove 344g provided in clutch lever stem 342 and the remainder of ring 344 projecting radially outwardly, adapted to cooperate with an adjacent portion of saddle 200 to preclude axial displacement of clutch lever stem 342 away from clutch crank stud 339. An integral crank pin portion 345 projects from clutch lever stem 342 parallel to the axis thereof into engagement with clutch lever fork 340. Thus, swinging of table feed clutch hand lever 343 effects rotation of clutch lever stem 342 and crank 345 integral therewith. Crank 345 cooperating with clutch lever fork 340 effects swinging of clutch shifter lever 295, about clutch crank stud 339. This rotational movement of crank 295 through shifter fork 294, effects reciprocation of clutch element 291 axially of shaft 289 for effecting engagement or disengagement of clutch 291 from its cooperating element 286. When clutch element 291 is in the position illustrated in FIG. 5, shaft 289 is stationary, that is to say, it is not rotated by forces transmitted from motor 59. When, through manipulation of table feed clutch lever 343, from the position shown in FIG. 1 into the position shown in FIG. 6, clutch member 291 is moved to the left from the position shown in FIG. 5, into engagement with clutch 286 and the latter is rotating, mechanical connection is established with shaft 289 and table feed screw shaft 312 is rotated to effect power feed of table 346 through its cooperative engagement with table feed nut 347, secured in fixed relation thereto by suitable means, such as screw bolt 347a illustrated in FIG. 4.

To effect automatic termination of power feeding of table 346 at predetermined limit positions thereof relative to saddle 200, an automatic kickout mechanism is provided, shown in FIGS. 1, 4, 6, and 24. When table feed clutch lever 343 is in the position illustrated in FIG. 6, clutch members 291 and 286 are engaged. Clutch lever stem 342 has integral pinion gear teeth 348 which are continuously in mesh with downwardly projecting rack teeth 350, provided in the underside of kickout transfer rack bar 353 reciprocably mounted in a groove provided in saddle 200, with its upper face substantially flush with face 349 of the table way. Kickout rack bar 353 is in subjacent relation to table 346, as shown in FIG. 6, and extends substantially parallel to measuring instrument V-groove 354 shown in FIGS. 1, 4, and 6. The groove in which transfer rack bar 353 lies, intersects a second groove 355 which extends transversely thereof. A kickout cam member 356 is mounted in groove 355 for reciprocation. The cam member 356 is cut away as at 353c to clear the adjacent end of kickout transfer rack bar 353 and has rack teeth 356t which remain in constant mesh with teeth 357t of gear 357. Gear 357 is secured in fixed relation to shaft 358 by means such as pin 357p. A gear 359 is also secured to shaft 358 by pin 359p as shown in FIG. 4. Teeth 359t of gear 359 remain in constant mesh with rack teeth 353t of kickout transfer rack bar 353. As shown most clearly in FIG. 4, shaft 358 extends through gears 357 and 359 into a well or bearing recess provided in saddle 200. Shaft 358 thus supports gears 357 and 359 for angular rotation in unison about a fixed axis. A pair of vertical cam faces 360, 361 are provided on table kickout cam 356. Cam faces 360, 361 are disposed at right angles to each other and in symmetric relation to the longitudinal center line of cam 356 as shown in FIG. 24. When table feed clutch hand lever 343 is shifted from the position in which it is shown in FIG. 1 to that in which it is shown in FIG. 6, kickout transfer rack bar 353 is shifted away from kickout cam 356 and simultaneously gears 357 and 359 cooperating with the bar 353 and cam 356 rotate to advance cam 356 leftwardly as viewed in FIGS. 4, 6, and 24, to the position shown in FIG. 6, as the feed clutch is engaged.

Table limit kickout cam lugs 362 may be secured to table 346 by means such as bolt 363, the head of which is cooperatively received in a T-slot 364 provided in table 346 and the threaded shank of which bolt is in cooperative engagement with nut 365. Each table limit kickout lug cam 362 has a cam face 366 parallel to and adapted to cooperate with a respective cam face 360 or 361 of table kickout cam 356. Thus, when table feed clutch lever 343 is shifted to the position illustrated in FIG. 6 and rapid traverse control lever 98 is in feed or rapid traverse position, while motor 59 is operating, table 346 is advanced relative to saddle 200. Assuming that table 346 moves toward the viewer from FIGS. 4 and 6, toward the right in FIG. 1, which is away from FIG. 7 in FIG. 24, table limit kickout cam lug 362 shown in FIGS. 4 and 24 will be carried toward kickout cam 356. Lug cam face 366 will engage opposed, parallel kickout cam face 360 when table 346 reaches a predetermined position relative to saddle 200. Further movement of table 346 along its ways will result in cam cooperation of lug face 366 with cam face 360 to force kickout cam 356 toward the right from the position shown in FIG. 6. Such movement effects clockwise rotation of gears 357 and 359 as viewed in FIG. 24, and bar 353 is advanced toward kickout cam 356 away from the viewer in FIGS. 4 and 6. Clutch lever stem 342 is simultaneously rotated by movement of bar 353 swinging lever 343 to the position shown in FIG. 1 while disengaging feed clutch members 291 and 289 terminating power feeding of table 346. When the kickout mechanism is in the position described, and table feed clutch lever 343 is in the position illustrated in FIG. 1, clutch 291 is also in engagement with clutch member 286, and the table feed screw 312 will be rotated in response to rotation of final drive sprocket wheel 78 through operation of motor 59 to advance the table 346 along its ways. Assuming that the table 346 is advancing out of FIG. 4 toward the viewer as it approaches the desired limit of travel in that direction, table feed stop limit cam 362 approaches table feed kickout cam 356 and cooperatively engages same to shift same into the retracted position corresponding to the disengaged relation of clutch elements 286, 291 illustrated in FIG. 5. Disengagement of clutch members 286, 291 terminates power movement of the table 346.

As shown in FIG. 4, means are provided for locking table 346 in fixed relation to saddle 200. Said means comprises a lower table clamp rod 367, a rocker member 368 supported for rocking movement on shaft 368s, an upper table clamp rod 369, and table clamp binder screw 370 in threaded engagement with table 346, or preferably as shown in cooperative engagement with a table binder screw bushing 371 secured in fixed relation to table 346. Clamp rods 369 and 367 are reciprocatable in parallel bores provided in table 346, and rocker 368 is rockable on supporting shaft 368s. Clamp rods 367, 369 and rocker 368 have cooperating contact faces in face-to-face abutment at 372 and 373, such that axial reciprocation of rod 369 (as shown in FIG. 4) toward the right, while in cooperative engagement with rocker 368 at 373, produces a corresponding clockwise movement of rocker 368 about the axis of shaft 368s. The clockwise movement of rocker 368 while in cooperative engagement with lower clamp bar 367 at 372 produces a corresponding movement of bar 367 toward the left, when viewed as shown in FIG. 4. The left end of lower bar 367 is adapted to engage table gib 374 which also cooperates with saddle 200. The movement of clamp bars 369, 367 and rocker 368, as previously described, may be effected by appropriate rotation of binder clamp screw 370 to advance same through clamp screw bushing 371. Such rotation of binder screw 370 results in movement of lower clamp bar 367 to the left to clamp table gib 374 against saddle 200, thereby binding table 346 in fixed relation to saddle 200. Rotation of screw 370 to axially advance it toward the left (when viewed as shown in FIG. 4), until gib clamping forces are no longer applied to clamp rod 367, releases table 346 for movement relative to saddle 200.

In FIGS. 1, and 8, hand wheel bracket 380 is shown secured in fixed relation to base 50, and hand wheel bracket cover 381 is secured in cooperating relation thereto. Hand wheel bracket tube 382 is secured in fixed relation to hand wheel bracket 380 and projects through an aperture provided in the wall of base 50. A pair of bearings 383 may be mounted in tube 382, as shown for cooperatively supporting hand wheel bracket shaft 384 for angular rotation and axial reciprocation therein. Column feed sprocket clutch 172 and column feed sprocket spacing collar 385 are mounted in freely rotatable relation to and upon shaft 384 which is longitudinally reciprocatable relative thereto. Column feed clutch 386 is mounted upon hand wheel bracket shaft 384 and secured in fixed relation thereto for unison rotation therewith and secured against movement longitudinally of the axis thereof by means such as taper pin 387. Column feed sprocket 172 and column feed clutch 386 are respectively provided with clutch teeth 168 and 388 adapted to be cooperatively engaged when shaft 384 with the associated clutch element 386 are moved to the right from the position shown in FIG. 8, that is, toward the hand wheel bracket 380, from the position shown in FIG. 8 to establish mechanical connection between members 172 and 386 to rotate shaft 384 in response to movement of chain 170 by operation of motor 59. To effect axial reciprocation of shaft 384 to move clutch 386 into and out of engagement with clutch teeth 168 of column feed sprocket 172, a rack collar 389 is mounted upon hand wheel bracket shaft 384. As shown, rack collar 389 is secured against axial reciprocation relative to shaft 384 between the radial end face of shoulder portion 390 of shaft 384 and hand wheel bracket shaft thrust bearing 391 adapted to cooperate with rack collar 389 and column feed thrust nut 392. As shown in FIG. 9, rack collar 389 is guided by hand wheel bracket cover 381 for reciprocation parallel to the axis of rotation of shaft 384 and in cooperative engagement with column feed clutch shifter lever pinion 393. Pinion 393 is mounted upon and secured to column feed cluthch shifter lever shaft 394 for rotation in unison therewith. Shaft 394 is journaled for rotation in bearing apertures provided in hand wheel bracket cover 381 for supporting pinion gear 393 in cooperative engagement with teeth 395 of rack 389. Column feed clutch shifter lever 396 is secured to shaft 394 by means such as set screw 397, whereby swinging of clutch lever 396 about the axis of shaft 394 effects rotation of shaft 394 and pinion 393 to reciprocate rack 389 relative to the hand wheel bracket cover 381. Such movement of rack 389 effects shifting of shaft 384 and column feed clutch 386 to move teeth 388 of the latter into and out of engagement with column feed sprocket clutch teeth 168. As shown in FIG. 8, a hand wheel shaft 398 is supported by hand wheel bracket 380 and bracket cover 381 in spaced parallel relation to hand wheel bracket shaft 384. A sprocket wheel 399 mounted upon shaft 384 and secured to the latter for rotation in unison therewith by key 400, is in cooperative engagement with roller chain 401. A second sprocket wheel 402 is secured in fixed relation to hand wheel shaft 398 for rotation in unison with that shaft. Thus, rotation of shaft 384 is accompanied by a corresponding rotation of shaft 398, and vice versa. Hand wheel 403 is secured to shaft 398, such that manual rotation of hand wheel 403 effects corresponding manual rotation of shaft 384. As shown in FIG. 8, the sprocket 399 is retained in the desired position of alignment with sprocket 402 by reason of its interposition between the annular shoulder or boss portion 404 of hand wheel bracket cover 381 and bearing member 383. It may be noted that hand wheel bracket shaft 384 may be freely reciprocated along its axis through the hub of sprocket wheel 399 in response to movements of the column feed clutch shifter lever 396. It may be further noted that shaft 384 is free to rotate relative to rack collar 389 which reciprocates axially in unison with it.

With reference to the mounting of hand wheel 403 upon hand wheel shaft 398, it is to be understood that hand wheel 403 may be secured to shaft 398 directly as by means of a key, or it may preferably be mounted upon shaft 398 for rotation relative thereto and cooperating clutch elements may be secured to shaft 398 and to hand wheel 403, respectively, for cooperative engagement and disengagement in response to axial movement of hand wheel 403 longitudinally of shaft 398 in a manner similar to that in which hand wheel 211 and saddle feed screw shaft 198 are adapted for cooperation, as described previously.

As shown in FIG. 12, hand wheel bracket shaft 384 is secured in cooperative engagement to universal joint or coupling 405, which, in turn, is cooperatively secured or connected to the hollow tubular bevel pinion drive shaft 406. As shown in FIG. 10, bevel pinion drive shaft 406 extends from universal coupling joint 405 toward column bevel gear bracket 407. Bevel gear pinion shaft 408 is journaled for rotation in bearings 409 and 410 supported by column bevel gear bracket 407. Bevel pinion gear shaft 408 extends through bearing 409 into the axial bore of hollow, tubular bevel pinion drive shaft 406. Key 411 couples shafts 406 and 408 for rotation in unison, while permitting axial movement of shaft 406 relative to 408. As shown in FIG. 10, bevel gear bracket 407 is mounted upon column gear bracket 412 between a radial shoulder face 413 and retainer 414 secured to the column gear bracket by means such as screws 415. Column gear bracket 407 is mounted in this way to permit rotation or swiveling thereof relative to column gear bracket 412. Thus, when shaft 384 is shifted axially to engage or disengage column clutch teeth 388 with the clutch teeth 168 of column feed sprocket 172, the angular relation of shafts 384 and 406 is correspondingly changed, a change compensated for by a change in attitude of the several parts of universal joint coupling 405. Further, it should be noted that axial shifting of shaft 384 is also accompanied by axial shifting of bevel pinion drive shaft 406 relative to bevel pinion shaft 408. The longitudinal movement of shaft 406 is accompanied by a corresponding swinging of that member, cooperating shaft 408, and column bevel gear bracket 407 about the axis of the latter and relative to column gear bracket 412. Thus, when shaft 384 is shifted to the right of the position in which it is shown in FIG. 8, which would correspond to a movement toward the head of the sheet upon which FIG. 12 appears, universal joint coupling 405 connected to shaft 384, would likewise be displaced toward the head of the sheet upon which FIG. 12 appears relative to the position in which it is shown in FIG. 12. Bevel pinion drive shaft 406 connected to the universal joint coupling 405 wil be displaced axially away from column bevel gear bracket 407 and with bracket 407 and bevel gear pinion shaft 408 swing clockwise from the position in which those members are shown in FIG. 12.

As shown in FIGS. 1, 10 and 12, column 420 is supported upon base 50. An annular radially projecting flange portion 421 is preferably provided upon column 420, the radial faces 422 and 423 of flange 421 being substantially parallel and flat. Face 423 extends from the periphery of flange 421 radially inward to downwardly extending hub-like flange portion 424 which has a cylindrical outer face adapted to cooperatively engage the cylindrical face or wall of the aperture provided in base 50 in which flange 424 is received. An annular bearing surface is provided upon the exterior or upper face of base 50 annularly of the aperture in which flange 424 is received, the bearing surface being adapted to cooperate with the flat radial face 423 of column flange 421. Thus, column 420 is supported by base 50 in an upright position for rotation about its axis. A plurality of column clamps 425, which, as shown, may be four in number, have radially inwardly projecting lug portions 426 adapted to engage face 422 of flange 421. As shown, column clamp bolts 427 are provided, each extending through a column clamp 425 into threaded engagement with base 50, whereby rotation of column clamp bolts 427 in a predetermined direction will urge the respective column clamps 425 toward base 50 to clamp flange 421 between base 50 and lug portion 426. Opposite rotation of bolt 427 thus would tend to release the column clamps 425 permitting angular movement of column 420 about its axis into a different desired position in which it may then be clamped by appropriate rotation of column clamp bolts 427.

To facilitate precise rotation of column 420 about its axis when supported on base 50, column rotating means are provided. Column hub flange extension 424e is by any suitable means secured in fixed relation to hub flange 424 and extends downwardly therefrom. Extension 424e has a set of integral worm wheel teeth 424t engaged by worm 446. Worm 446 is supported on shaft 476 and coupled thereto by means such as key 446k and set screw 446s. Shaft 476 may be journaled in a pair of aligned bearings (one of which 476b is shown) supported in tubular cartridge or bracket 477. A portion of shaft 476 extends outwardly from cartridge 477 and handwheel 478 is mounted thereon as shown in FIG. 12. Handwheel 478 may be secured in fixed relation to shaft 476 as shown, by any suitable means, or clutch means may be provided similar to that shown for coupling handwheel 211 to cross feed screw shaft 198 (FIG. 4). Cartridge 477 extends through apertures in the outer wall and reinforcing webs of frame 50. Screws 477s, 477u have conic points and are in threaded engagement with frame 50. Screws 477s, 477u are rotated to advance the conic tip portions thereof into mating recesses provided in cartridge 477 to urge the cartridge into firm engagement with frame 50 and to preclude axial displacement of the cartridge. Shaft 476 and worm 446 mounted thereon are supported against axial movement relative to cartridge 477. Thus when bolts 427 are backed off to release column clamps 425, rotation of handwheel 478 effects rotation of worm 446, the latter being in constant meshing engagement with worm wheel teeth 424t to effect rotation of column 420 about its axis. As shown in FIG. 1, an index line 50i may be provided in base 50 and graduations 421g in the cylindrical edge face 421e of column flange 421 for cooperatively indicating the degree of rotation of column 420. When column 420 is rotated to the position desired, bolts 427 may be tightened down and clamps 425 will secure column 420 in fixed relation to base 50.

Column gear bracket 412 is mounted in fixed relation to column 420 by means such as screws 416. As previously explained, column bevel gear bracket 407 is mounted upon column gear bracket 412 and retained in cooperative relation therewith by retainer 414. Column pinion shaft 428 is journaled for rotation in column gear bracket 412 in coaxial relation with column 420 and bracket 412. As shown in FIG. 10, column pinion shaft 428 has integral pinion portions 429 and 430. The lower portion of column pinion shaft 428 extends into an axial bore in driven bevel gear hub 431 to which it is coupled for rotation in unison by a key 432. Pinion shaft 428 is axially reciprocatable relative to column gear bracket 412 and driven bevel gear hub 431. Driven bevel gear hub 431 is journaled for rotation in radial bearing 433 supported in column gear bracket 412 adjacent retainer 414. Driven bevel gear 434 is mounted upon and secured in fixed relation to driven bevel gear hub 431 in abutment with annular rib or shoulder portion 435 thereof for rotation in unison therewith. A driven bevel gear thrust washer 436 is provided in cooperative relation between driven bevel gear 434 and retainer 414 annularly of shoulder portion 435 to take up thrust loads imposed axially upward through bevel gear 434. Bevel pinion gear 437 is mounted upon bevel gear pinion shaft 408 to which it is secured by means such as taper pin 438 for rotation in unison therewith. Bevel gear 437 is adapted to cooperate with bearing 410 to preclude shifting of bevel gear pinion shaft 408 to the left of the position in which it is shown in FIG. 10. Driven bevel gear 434 substantially precludes shifting of bevel gear pinion shaft 408 toward the right of the position in which it is shown in FIG. 10, as bevel gears 434 and 437 remain in mesh at all times. Column pinion shaft 428 is thus constantly coupled mechanically to hand wheel bracket shaft 384 and hand wheel shaft 398 for simultaneous corresponding rotation. As shown in FIGS. 10 and 12, column pinion shaft 428 has an upper portion of reduced diameter 439. Column pinion shaft rack 440 has a central bore in which aligned coaxial bearing inserts 441 and 442 may be provided and adapted to cooperatively engage portion 439 of the column pinion shaft. As shown most clearly in FIG. 10, rack retaining means, such as nut 443, may be provided in fixed cooperating relation to portion 439 of the column pinion shaft, to preclude axial displacement of column pinion rack 440 longitudinally of the column pinion shaft. Column gear bracket 412 has an integral bearing pedestal portion 444 adjacent its upper end, as shown in FIGS. 10 and 12. Column shifter pinion shaft 445 is journaled for rotation in a bearing provided in projecting boss 444a of column 420 and in a bearing provided in bearing pedestal 444. Column shifter pinion 447 and column shifter pinion shaft lever 448 are respectively secured to shifter shaft 445 for rotation in unison therewith by key 449 and set screw or taper pin 450. Thus, swinging of lever 448 effects rotation of pinion 447, in cooperative engagement with rack 440, to shift the rack 440 and associated column pinion shaft 428 axially in column gear bracket 412 into the overarm advancing or column feed shaft rotating position, or alternatively, into the column feed screw rotating position, positions of column pinion shaft 428 which will be more clearly understood from following portions of this specification.

Idler stub shaft 412p is supported by column 420, and column gear bracket 412. Set screw 412s secures shaft 412p against movement relative to column gear bracket 412. Sleeve bearing 412b surrounds the central portion of shaft 412p and extends between column 420 and column gear bracket 412. Idler gears 451 and 454 are journaled for rotation on sleeve bearing 412b between spacing washers 412w which preferably serve as thrust bearings for the idlers 451 and 454, as well.

Column pinion shaft 428 is shown in column feed shaft rotating position in FIG. 10, with integral pinion portion 429 in cooperative engagement with column feed shaft driving idler gear 451. As shown in FIGS. 10 and 11, idler gear 451 is in cooperative meshing engagement with feed shaft pinion 452 which is secured to and rotates in unison with feed shaft 453. When shifter lever 448 is swung from the position in which it is shown in FIG. 12 to the position in which it is shown in FIG. 1, column pinion shaft 428 is shifted axially upward from the position in which it is shown in FIG. 10 until pinion 430 is in cooperative meshing engagement with idler 454. As shown in the generally schematic view of FIG. 11, when pinion 430 is in meshing engagement with idler 454, rotation of pinion 430 effects a corresponding rotation of idler 454 and the meshing raising screw pinion 455 secured to raising screw 456, for rotation in unison therewith. Raising screw 456 is supported in vertical position by and within column 420 in parallel relation to column saddle ways 457. Column end bracket 458, shown in FIG. 1, is secured to the upper end of column 420. Feed shaft 456 is journaled for rotation adjacent its ends in vertically aligned bearings provided respectively in column 420 at an elevation substantially equal to the elevation of flange 421 and in the upper end bracket 458. Suitable thrust bearings may be provided to carry the axial or thrust loads to which vertical raising screw shaft 456 is or may be subjected. The thrust transfer means may be collar members 459, 460 secured to raising screw shaft 456 below and above upper column end bracket or plate 458, suitable thrust bearings being interposed in cooperative relation between the respective collars 459 and 460 and the adjacent cooperating column upper end plate 458. As shown in FIGS. 12 and 13, column saddle 462 is mounted on and reciprocable along column ways 457. As shown in FIG. 12, suitable tapered gibs 461 may be provided in cooperative engagement with column 420, adjacent ways 457 thereof and column saddle 462. Suitable gib adjusting screws, not shown, functioning in a fashion similar to overarm gib adjusting screws 505 are provided. Column saddle 462 has column saddle raising screw nut 463 secured thereto by means such as screws 464. Nut 463, secured to saddle 462 by screws 464, is in fixed relation to the column saddle 462 and secured against rotation about the axis of raising screw 456 with which it is in threaded cooperative engagement. Raising screw 456 extends parallel to ways 457 and rotation of raising screw 456 in cooperative engagement with raising screw nut 463, effects reciprocation of column saddle 462 longitudinally of ways 457. To counterbalance a substantial portion of the load moved by raising screw 456 relative to column 420, I prefer to provide counterbalancing means. A counterbalance bracket 836, a separate element or an integral portion of column end bracket 458, is shown in FIG. 1 secured in fixed relation on the top of column 420 and supporting counterbalance pulleys 837 and 838 for rotation about respective horizontal parallel axes. A rear counterbalance shaft 839 (shown in FIGS. 1 and 12) and front counterbalance shaft 840 (shown in FIG. 1) are supported by base or frame 50. Pulleys 841 and 842 are respectively supported on shafts 839 and 840 for rotation. Anchor bar 843 (FIG. 12) is secured in fixed relation to frame 50. Suitable means such as a plurality of eye-bolts 844, may be secured to anchor bar 843 for coupling one end of helical springs 845 thereto. A traveling tie bar 846 having eye-bolts 847 secured thereto is provided as shown in FIG. 2. A plurality of tension springs 845 extend in substantially parallel relation and cooperate with eye-bolts 847 and 844 to resiliently couple traveling tie bar 846 with anchor bar 843. Counterbalance cable 848 is secured adjacent one of its ends to column saddle 462 and adjacent the other of its ends to traveling tie bar 846. Cable 848 extends from column saddle 462 up and cooperatively over pulleys 837 and 838, thence down and cooperatively under pulley 841, thence horizontally beneath angle plate bracket portion 58 to pulley 842 cooperatively about which it is trained and thence extends horizontally to bar 846 which, as shown in FIG. 2, is beneath the elevation of angle plate bracket portion 58. Thus the counterbalanced load tends to advance saddle 462 down the column pulling cable and attached tie bar 846 with it. Tension springs 845 are elongated and resist movement of bar 846 away from anchor bar 843. Springs 845 are of selected strength and size, and provided in numbers indicated by the counterbalancing effect desired.

As is also shown in FIG. 13, feed shaft 453 extends substantially parallel to raising screw 456 and ways 457. Feed shaft 453 is journaled for rotation adjacent its upper end in suitable bearings provided in the upper end plate 458 and adjacent its lower end in a bearing supported by column 420 at an elevation substantially equal to that of flange 421. As shown in FIG. 10, a pair of thrust bearing members 465 and 466 are provided respectively above and below the lower feed shaft bearing supporting portion of column 420, and between that portion of column 420 and thrust collar 467 and pinion 452, respectively. Pinion 452 and thrust collar 467 are so spaced that axial displacement of feed shaft 453 is substantially precluded.

Feed shaft 453 also extends through aligned apertures provided in feed shaft worm bearing pedestals 468 and 469, feed shaft worm thrust bearings 470 and 471, and feed shaft worm 472. Feed shaft worm 472, as shown in FIG. 12, is coupled to feed shaft 453 for rotation in unison therewith by key 473. Worm 472 and key 473 are adapted for movement in unison longitudinally of feed shaft 453 between thrust bearings 470 and 471 supported by pedestals 468 and 469. Pedestals 468 and 469 are integral portions of feed shaft worm bracket 474 which is secured in fixed relation to column saddle 462 by means such as screws 475. Movement of column saddle 462 longitudinally along its ways 457 by rotation of raising screw 456, will result in corresponding longitudinal movement of worm 472 along feed shaft 453. I prefer that radial bearings be provided in and supported by pedestals 468 and 469 for radially supporting feed shaft 453 and through it, worm 472 for rotation about an axis fixed in relation to feed shaft worm bracket 474.

Column saddle plate or overarm saddle 480 is mounted upon column saddle 462 by means of four column saddle plate bolts 481 the heads 479 of which are cooperatively received in circular T-slot 483 provided in column saddle 462. As shown in FIG. 13, column saddle plate cover 484 is secured by means such as screws 485 to the column saddle plate 480. The column saddle plate mounting bolts 481 pass through both the column saddle plate and the column saddle plate cover into threaded cooperative engagement with column saddle plate nuts 482, the heads 479 of bolts 481 cooperating with the circular T-slot 483 to secure the bolts 481 against axial rotation incident to tightening and loosening of nuts 482. Column saddle 462 has a recess in concentric relation with circular T-slot 483, the recess being adapted to receive saddle plate guide 486 in cooperative engagement with saddle 462. Column saddle plate guide 486 is secured in fixed relation to the column saddle plate 480 by securing means such as screws 487. Saddle plate guide 486 has an axial aperture in which bearing member 488 is supported for cooperative engagement with worm pinion shaft collar 489. Worm pinion shaft collar 489 is mounted upon worm pinion shaft 490 with its radial end faces respectively adapted for cooperative engagement with column saddle 462 and the abutting radial face of pinion portion 491 which may be an integral portion of worm pinion shaft 490. Thus, collar 489 precludes axial displacement of worm pinion shaft 490 to the right of the position in which it is shown in FIG. 13. Worm pinion 490 is also journaled in a second bearing member 492, supported by feed shaft worm bracket 474 and having its radial end faces respectively adapted for cooperative abutting engagement with column saddle 462 and the radial face of feed worm wheel 493. Feed worm wheel 493 is secured in fixed relation to worm pinion shaft 490 by suitable securing means, such as taper pin 494. Thus bearing member 492, feed worm wheel 493 and taper pin 494 cooperate to preclude axial displacement of worm pinion shaft 490 axially to the left of the position in which it is shown in FIG. 13. Feed worm wheel 493 is in constant cooperative engagement with feed shaft worm 472, as shown in FIG. 12, such that angular rotation of feed shaft 453 effects a corresponding rotation of pinion 491. An overarm feed idler gear 495 is supported in meshing engagement with pinion 491 upon idler shaft 496 journaled in bearings 497 and 498 supported respectively in coaxial alignment by column saddle plate 480 and column saddle plate guide 486. Idler gear 495 is in cooperative meshing engagement with overarm feed pinion 499 journaled for rotation upon overarm feed pinion stud 500 which is supported in an aperture provided in column saddle plate 480. Overarm feed pinion 499 is also in meshing engagement with overarm rack 501 secured in fixed relation to overarm 502 by suitable fastening means, such as screws 503. Thus, rotation of pinion 491 produces corresponding rotation of idler gear 495 and overarm feed pinion 499 to effect longitudinal movement of overarm rack 501 and overarm 502 relative to saddle plate 480. Column saddle plate gib 504 is an elongate, tapered member shown in transverse section in FIG. 13. As shown in FIG. 12, column saddle gib 504 may be shifted in column saddle plate 480 by appropriate rotation of gib adjusting screws 505, the threads of which cooperatively engage in column saddle end plate 507, shown in FIG. 12, and which is similar to column saddle end plate 508 shown in FIGS. 12 and 1. Gib binding means are provided, such as binder screws 509 which cooperatively engage column saddle plate 480 and column saddle plate gib 504. Rotation of the screws 509 will urge gib 504 against overarm 502 to bind or lock same in fixed relation to column saddle plate 480.

Thus it may be seen that, when screws 509 are so positioned that gib 504 is in nonbinding relation to overarm 502 and column saddle mounting bolt nuts 482 are tightened to secure 462 and 480 in fixed relation to each other, the overarm 502 may be fed longitudinally through column saddle plate 480 by rotation of hand wheel 403 in driving engagement with shaft 398 while pinion 429 is in engaging relation with idler 451. Such rotation of hand wheel 403 produces rotation of feed worm 472. The same operation may be accomplished by manipulation of lever 396 when column feed sprocket clutch 172 is rotating in response to operation of motor 59.

Means for precise controlled rotation of column saddle plate 480 relative to column saddle 462, are shown in FIGS. 12 and 27. Column saddle worm bracket 786 is secured in fixed relation to column saddle 462. Worm wheel teeth 787 are provided in fixed relation to column saddle plate or overarm saddle 480. Teeth 787 may be integral portions of saddle plate 480 or of a sector member 788 secured in fixed relation thereto by any suitable means (not shown). Column saddle worm 789 is supported on column saddle worm shaft 804 journaled for rotation in column saddle worm bracket 786. Shaft 804 is secured against axial shifting relative to bracket 786 by means such as integral head shoulder 805 and stop collar 806 which is secured to shaft 804 by any suitable means such as taper pin 807. Column saddle worm 789 is coupled to shaft 804 for rotation in unison therewith by any suitable means (not shown), and is in constant meshing engagement with a plurality of worm wheel teeth 787. Shaft 804 has a square head 808 adjacent shoulder 805 adapted to be engaged by a wrench such as T-socket wrench 809 shown in FIG. 27. Thus to alter the attitude of ram or overarm frame 502 with respect to column 420, column saddle plate nuts may be backed off (loosened), shaft 804 and worm 789 rotated by wrench 809 to effect rotation of column saddle plate 480 about its (horizontal) axis to the position desired, and then nuts 482 may be tightened to secure saddle plate 480 in fixed relation to column saddle 462. Worm wheel teeth 787 may extend along any desired arc, that is, for 360° around column saddle plate 480 or through a lesser arc such as that shown, which is of an extent as will properly cooperate with worm 789 through an arc of 40°. The worm 789 and worm wheel teeth 787 shown in the drawings are arranged so that overarm 502 may be inclined thereby as desired between limit positions in which it extends from motor 516, downwardly at an angle of 15° to the horizontal or upwardly at an angle of 25° to the horizontal, to head carrier 601. Overarm 502 shown, can be inclined at angles beyond these limits, but not under control of worm 789 and cooperating worm wheel teeth 787. The extent of arc upon which teeth 787 are provided, is selected in view of the desired limits of tilting of arm 502.

As previously explained, hand wheel 403 may be manipulated to reciprocate ram 502 longitudinally through column saddle plate 480 when gib binder screws 509 are in loosened position, nuts 482 in tightened condition, and shifter lever 448 is in the position in which it is illustrated in FIG. 12. When shifter lever 448 is shifted from the position in which it is illustrated in FIG. 12 into the position in which it is illustrated in FIG. 1, rotation of hand wheel 403 effects rotation of raising screw 456 to reciprocate column saddle 462 longitudinally up and down its ways 457. Similarly, the same operations may be accomplished by power feed when shifter lever 396 is swung, in a clockwise direction as viewed in FIG. 1, from the position in which it is shown in FIGS. 1 and 8 to engage clutch teeth 388 and 168, as previously explained.

*Overarm*

The overarm, as shown in FIGS. 1, 12, and 13 is mounted for longitudinal reciprocation in cooperative relation with column saddle plate 480 and the cover therefor 484. As shown more clearly in FIGS. 1, 14, and 15, the overarm comprises a main frame member 502 having a clutch aperture closed by overarm clutch cover 510, and a gear box section access opening covered and closed by overarm plate 511. The members 502, 510, and 511 may be any suitable material, such as cast iron. Overarm plate 511 and overarm clutch cover 510 are demountably secured to frame 502 as shown in FIG. 1. As shown in FIGS. 1 and 14, overarm motor bracket 512 is secured to one end of overarm frame 502, while overarm cap 513 is secured to the opposite end of frame 502. Overarm cap 513 may be secured to overarm frame 502 by any suitable means, such as mounting bolts 514, shown in FIG. 1, securing cap 513 in cooperative relation to overarm frame 502. Overarm motor bracket 512 is secured to overarm frame 502 by means such as bolts 515 (FIG. 14). Overarm motor 516 is mounted upon the overarm motor bracket 512, and, as shown in FIGS. 1 and 14, the motor 516 may be of the pan-cake type. Shaft 517 of motor 516 projects longitudinally into the hollow overarm frame 502 in coaxial alignment with overarm drive shaft 518. The shaft 518 is journaled for rotation in anti-friction bearings 519 and 520, respectively, supported by bearing pedestal portions of overarm frame 502. A driving cup 521 is coupled to motor shaft 517 by key 522 and secured against axial displacement relative thereto by set screw 523. Suitable clutch discs 524 are carried by driving cup 521 and are adapted for cooperative engagement with driven elements 525 coupled to shaft 518, for rotation in unison therewith by means such as key 526. The cooperating discs 524 and 525 are disposed axially of shaft 518 between clutch plates 527 and 528. As shown in FIG. 14, clutch plate 527 is supported in annular relation to and upon shaft 518 and movement thereof axially of shaft 518 towards motor 516 is precluded by retaining ring 529, which cooperatively engages the shaft 518 and clutch plate 527. Clutch plate 528, on the other hand, is disposed annularly about shaft 518 and adapted for reciprocation longitudinally thereof to urge discs 524 and 525 into frictional engagement whereby shaft 518 may be coupled to driving cup 521 for rotation in unison therewith, the axial reciprocation of clutch plate 528 being controlled by clutch shifter 530.

A brake cup 531 is mounted in fixed relation to overarm frame 502 by means such as screws 532 which are secured in spaced concentric annular relation to bearing 519 and the shaft 518, journaled for rotation therein. Brake cup 531 is in supporting cooperative engagement with brake discs 533 which annularly surround shaft 518 and between which cooperating brake discs 534 coupled to shaft 518 by means such as key 535, project. A pair of annular pressure plates 536 and 537 are mounted upon shaft 518. A stop ring 538 in cooperative engagement with shaft 518 and pressure plate 536 precludes axial displacement of the latter to the right of the position in which it is shown in FIG. 14. Pressure plate 537 is mounted for axial reciprocation longitudinally of shaft 518 by means of clutch actuating member 530. Thus, when clutch actuating member 530 is moved to shift pressure plate 528 toward pressure plate 527, shaft 518 may be coupled to motor 516 for rotation thereby. Shifting of clutch actuating member 530 in the opposite direction, that is, to permit pressure plate 528 to move away from pressure plate 527, would simultaneously advance pressure plate 537 toward pressure plate 536, when the mechanism is properly adjusted, to cause discs 533 and 534 to engage, braking the drive shaft 518 to a stop. Clutch actuating member 530 is in cooperative engagement with shifter 539 which, in turn, is in co-operative engagement with and movable by clutch yoke 540. Clutch yoke 540 is pivoted upon clutch yoke pin 541 secured to and supported by overarm frame 502. Clutch yoke 540 is coupled to clutch link 542 by link pin 543. The link 542 is connected by eccentric stud 544 to eccentric 545 secured by suitable means such as set screw 546 upon clutch eccentric crank shaft 547. Clutch eccentric crank 548 is mounted upon clutch eccentric crank shaft 547 and secured in fixed relation thereto by any suitable means such as set screw 549. Clutch lever crank 550 (FIGS. 1 and 15) is pivotally mounted upon clutch lever stud 551 threadedly engaged with overarm cap 513. As shown in FIG. 1, clutch lever crank 550 has an integral hand lever 552 provided for manual swinging of lever crank 550 about the pivot stud 551. A second integral crank arm 553 projects from clutch lever crank 550 and is coupled by pin 554 to clutch lever link 555, the latter being also coupled to clutch eccentric crank 548 by means of coupling pin 556. Thus swinging of arm 552 produces a corresponding swinging of clutch yoke 540 about pivot 541 to move the clutch and brake actuating member 530 axially of drive shaft 518

As shown in FIG. 14, drive pinion 557 is mounted upon drive shaft 518 and coupled thereto by means such as taper pin 558. As shown, the hub of pinion 557 may project into intervening cooperative engagement with bearing 520 and shaft 518. A cluster gear shaft 560 is journaled for rotation in bearings 561 and 562 supported by overarm frame 502 in substantially parallel relation to drive shaft 518. A cluster shaft driving gear 563 is mounted upon cluster shaft 560 and coupled thereto by means such as splines 564 for rotation in unison therewith. As is shown in FIG. 14, cluster shaft driving gear 563 and the abutting cluster shaft bearing 562 are disposed between and in respective abutment with cluster gear shaft snap ring 565 and cluster gear shaft bearing nut 566. Ring 565 is partially received in an annular groove provided in cluster gear shaft 560. The cluster gear shaft bearing nut 566 is in engagement with the threaded end portion of cluster gear shaft 560 and is preferably locked in fixed relation relative to shaft 560 by suitable means, such as set screws, or the like (not shown). The structure just described substantially precludes axial displacement of cluster gear shaft 560 relative to overarm frame 502. A plurality of splines 567 project radially outwardly from shaft 560 and extend from adjacent cluster shaft snap ring 565 to adjacent bearing 561. A cluster gear 568 is mounted upon shaft 560 in cooperative engagement with splines 567. Splines 567 serve to couple cluster gear 568 to shaft 560 for rotation in unison therewith while permitting reciprocation of cluster gear 568 axially along shaft 560 between cluster gear shaft snap rings 565 and 569. The cluster gear 568 shown in FIG. 14 has four sets of teeth projecting radially therefrom. Each of the four sets of radially projecting teeth on cluster gear 568 functions as a gear of given size, and, for convenience in further description of the embodiment of the invention illustrated in the drawings, have been designated 570, 571, 572, and 573. As shown, the respective sets of teeth project radially from respective spaced, annular shoulder portions of cluster gear 568. An intermediate shaft 574 is journaled for rotation in bearings 575, 576, and 577. Bearings 575 and 576 are supported by overarm frame 502, and bearing 577, by overarm cap 513, as shown in FIGS. 14 and 15. Intermediate shaft 574 has a shoulder portion 578 in cooperative engagement with bearing 576. A threaded portion of shoulder portion 578 is in threaded engagement with intermediate shaft bearing nut 579, secured in fixed relation thereto by suitable means, such as set screws, or the like, not shown. Bearing nut 579 cooperates with bearing 576 to preclude axial displacement of intermediate shaft 574 to the left of the position in which it is shown in FIG. 14. Driven gear 580 is mounted upon intermediate shaft 574 in abutment with the radial end face of shoulder 578 remote from bearing nut 579. In sequence to the left of intermediate shaft driven gear 580 upon intermediate shaft 574 are mounted respectively, spacing collar 584, gear 583, spacing collar 585, gear 582, spacing collar 586, gear 581, and spacing collar 587, the latter of which is in cooperative engagement with the abutting radial face of intermediate shaft bearing 575. Intermediate shaft bearing nut 588 is in engagement with threads provided on shaft 574 in cooperative engagement with bearing 575. Thus, intermediate shaft 574 is secured against axial displacement relative to overarm frame 502 by nuts 579 and 588. Gears 580, 581, 582, and 583 and spacing collars 584, 585, 586, and 587 may be secured to shaft 574 for rotation in unison therewith by means such as key 589.

Gear 580 is adapted to mesh with the set of teeth 570, and when so engaged, shaft 574 will be driven at the lowest speed of rotation relative to the speed of rotation of cluster gear shaft 560. In like manner, gear 581 is adapted to meshingly engage the set of teeth 571 of cluster gear 568 when cluster gear 568 is appropriately positioned axially of shaft 560. When the gears 581 and 571 are in meshing engagement, intermediate shaft 574 will rotate at low intermediate speed relative to shaft 560. Gear 582 is adapted to cooperatively engage the set of teeth 572 of cluster gear 568 and when so engaged, intermediate shaft 574 rotates at high intermediate speed relative to shaft 560; and finally, gear 583 is adapted to meshingly engage set of teeth 573 of cluster gear 568 and when so engaged, intermediate shaft 574 rotates at high speed relative to cluster gear shaft 560. The portion of intermediate shaft 574 extending to the right of shoulder portion 578 in FIG. 14 is designated 590 and has radially projecting splines 591 adapted to cooperatively engage back gear 592 and couple it to shaft portion 590 for rotation in unison. Back gear 592 has two sets of radially projecting teeth 593 and 594, respectively adapted to co-operatively engage low speed gear 595 and high speed pinion 596. Back gear 592 is mounted for axial reciprocation longitudinally of portion 590 of intermediate shaft 574, whereby teeth 593 or teeth 594 may be engaged with the teeth of corresponding gears 595 or 596, as desired. When back gear 592 is in mesh with low speed gear 595, as shown in FIG. 14, the integral shank or shaft portion 597 of high speed pinion 596 to which gear 595 is coupled by key 598, is rotated at a speed slower than that of intermediate shaft 574. When gear 592 is shifted to the right of the position in which it is shown in FIG. 14, and its teeth 594 are in meshing engagement with high speed pinion 596, shaft 597 rotates at a speed higher than the speed at which intermediate shaft 574 rotates. High speed pinion shaft 597, as shown in FIG. 15, is journaled for rotation in bearings, such as antifriction bearings 599 and 600 supported by head carrier 601. Cross-shaft driving bevel gear 602 is mounted upon shaft 597 adjacent its end remote from high speed pinion 596. Bevel gear 602 is coupled to shaft 597 by a key 603 and is secured against axial displacement relative to shaft 597 between bearing 600 and pinion nut 604 in cooperative engagement with the threaded end portion of shaft 597 adjacent bevel gear 602. Cross shaft driving bevel gear 602 is in continuous meshing engagement with cross shaft bevel gear 605 mounted upon cross shaft 606 and secured thereto for rotation in unison therewith by means such as taper pin 607, shown in FIG. 16. Cross shaft 606 has a jack shaft driving bevel gear 608. Jack shaft driving bevel gear is mounted upon cross shaft 606 and coupled thereto for rotation in unison therewith, by means such as key 609. As shown in FIG. 16, the hub of jack shaft driving bevel gear 608 may be in cooperative engagement with cross shaft bearing 610 in which it is journaled for rotation. Cross shaft 606 is also journaled for rotation in bearing 611. To preclude axial displacement of shaft 606 from the position in which it is shown in FIG. 16, cross shaft bearing nut 612 and cross shaft gear nut 613 cooperatively engage the shaft 606, and respectively bearing 611, or jack shaft driving bevel gear 608. Nuts 612 and 613 are preferably similarly secured in fixed relation to shaft 606 as by means such as the set screw 614 cooperating with bearing nut 612 and shaft 606.

As shown in FIGS. 14 and 15, particularly the latter, head carrier 601 is mounted in overarm cap 513 for rotation about an axis coinciding with the axis of high speed pinion shaft 597. The radial end face of overarm cap 513 and the cooperating radial shoulder face of head carrier 601 are in cooperative abutting relation in plane 615 and serve to limit movement of head carrier 601 to a predetermined position of maximum displacement toward overarm frame 502, the position in which head carrier 601 is shown in FIG. 15. The cylindrical portion of head carrier 601 received within overarm cap 513 has an annular groove 616 provided therein. Groove 616 has a frustoconic wall 617 adapted to cooperate with the inclined wedge face of head carrier clamp or back lock members 618. A plurality of head carrier clamp members 618 are urged into annular groove 616 by screws 619 in threaded cooperation with overarm cap 513. The head carrier clamp members 618 wedgingly cooperate with the conic wall of groove 616 to retain head carrier 601 in firm cooperative abutment with overarm cap 513 at 615, while permitting rotation of head carrier 601 about its axis relative to and within overarm cap 513 with a minimum amount of play. To facilitate selective positioning of head carrier 601 relative to overarm cap 513, integral teeth 620 are provided in the shank portion of head carrier 601, to function as a worm wheel adapted to cooperate with head carrier worm 621 supported against axial displacement in overarm cap 5133 on shaft 622 to which it is coupled for rotation by suitable means, such as key 623, the worm 621 being secured against displacement axially of shaft 622 by cap 513 and limited to rotational movement about the axis of shaft 622 in cooperative engagement with teeth 620. As shown in FIG. 1, worm shaft 622 terminates in a suitably formed head portion 624 adapted for cooperative engagement by a key or wrench. Thus, a key or wrench in engagement with portion 624, may be utilized to rotate worm 621 for effecting controlled rotation of head carrier 601 about its axis within and relative to overarm cap 513. An index line and graduations, not shown but similar to those shown in FIG. 25, may be provided on head carrier 601 and overarm cap 513, respectively, adjacent their plane of abutment 615 to indicate the attitude of head carrier 601 with respect to overarm cap 513. To lock head carrier 601 in any desired position relative to overarm cap 513, a binder is provided. The binder comprises a pair of spaced members, one a hollow sleeve 626, the other a nut 627, each having face portions adapted to cooperate with the cylindrical shank portion of head carrier 601 in substantial conformity with the exterior face thereof. A binder actuating screw 625 has its head disposed adjacent the head portion 624 of head carrier worm shaft 622, as shown in FIG. 1. The binder actuating screw 625 extends through binder sleeve 626 into threaded engagement with binder nut 627, whereby rotation of screw 625 draws sleeve 626 and nut 627 toward each other. The sleeve 626 and nut 627 are reciprocable axially in a bore provided in overarm cap 513, the center line of which bore is perpendicular to and spaced from the axis of rotation of head carrier 601. Thus, binding engagement of sleeve 626 and nut 627 with the shank of head carrier 601 may be established and increased or decreased and released by appropriate rotation of screw 625.

Head 630, as shown in FIGS. 15 and 16, is mounted upon head carrier 601 for rotation about an axis coincident with the axis of cross shaft 606. As shown, particularly in FIG. 16, head 630 is in cooperating engagement with the cylindrical exterior surface of boss or shoulder portion 631 which is an integral portion of head carrier 601. A circular T-slot 632 is provided in head 630 in concentric spaced relation to boss 631. The heads, not shown, of head mounting bolts 633, which, as shown in FIG. 15, may be four in number, are received in T-slot 632, such that in any given position in the T-slot 632, each bolt 633 will have a particular position from which it does not rotate incident to tightening of head bolt nuts 634 shown in FIG. 1. Thus when head bolt nuts 634 are loosened, head 630 may be rotated through an angle of 360° about its axis of rotation. As shown in FIGS. 1, 15, and 16, head carrier 601 has an integral pedestal portion 628 in which head indexing worm shaft 671 is journaled for rotation. Head indexing worm 672 is secured to shaft 671 by any suitable means, such as taper pin 672p. Worm 672 is thus rotatable with shaft 671 by which it is supported against axial displacement relative to head carrier 601. Worm wheel teeth 695 are provided on an appropriate pitch circle on head 630 and are engaged by worm 672. Thus, when head mounting bolt nuts 634 are backed off enough to release head 630 for swinging about relative to head carrier 601, swinging of head 630 may be effected and controlled by rotation of worm shaft 671. As shown in FIGS. 1 and 15, shaft 671 has a head-like portion 696h adapted for cooperating engagement with an appropriate wrench (not shown) by means of which worm 672 may be rotated to rotate head 630 about the axis of boss 631 through any angle more or less than 360 degrees. As shown in FIGS. 15 and 25, at least one index mark 696 may be provided on head carrier 601 adjacent graduations 697 on head 630 for indicating the attitude of head 630 relative to head carrier 601. When head 630 is moved into the desired position relative to head carrier 601, nuts 634 may be tightened to lock members 601 and 630 in unitary relation.

As shown particularly in FIG. 16, a jack shaft 635 is mounted for rotation in bearings 636 and 637 supported in jack shaft cartridge 638. Jack shaft bevel gear 639 is secured to jack shaft 635, by means such as taper pin 640, adjacent bearing 637 and jack shaft gear 641 is mounted upon shaft 635 and coupled thereto by a key 642. Jack shaft gear 641 and spacing collar 643 are disposed between bearing 636 and jack shaft gear nut 644 which is in threaded engagement with shaft 635. Jack shaft 635, when supported in bearings 636, 637 and gears 639 and 641 are mounted thereon, is secured against axial displacement relative to jack shaft cartridge 638. The jack shaft and cartridge assembly is inserted into head 630 until jack shaft bevel gear 639 is in meshing engagement with jack shaft driving bevel gear 608, a position in which the jack shaft cartridge 638 is secured in fixed relation to head 630 by any suitable means, such as pins or the like (not shown).

Jack shaft gear 641 (FIG. 16) is in meshing engagement with spindle gear 645 (FIG. 20) keyed in fixed relation to and for rotation in unison with spindle sleeve 646. Spindle sleeve 646 is journaled for rotation in the spindle sleeve bearings 647 and 648, respectively, supported in head cap 649 and spindle sleeve bearing ring 650. The axis of rotation of spindle sleeve 646 is parallel to the axis of rotation of jack shaft 635. A retaining ring 651, as shown, may be placed in cooperative engagement with bearing 648 and spindle sleeve bearing ring 650 to preclude axial displacement of the spindle sleeve axially away from head cap 649. Spindle sleeve bearing nut 652 may be provided in co-operative engagement with spindle sleeve 646 and bearing 647 to retain the latter in cooperative engagement with head cap 649 and to preclude axial displacement of spindle sleeve 646 toward head cap 649. Spindle 653 is journaled for rotation in bearings 654 and 655 supported in quill 656, which, in turn, is mounted for reciprocation longitudinally of the bore provided therefor in head 630. Axial displacement of spindle 653 relative to quill 656 is precluded by spindle bearing nut 657 and the radial end face of shoulder portion 658 of spindle 653. A portion of spindle 653 projects into the hollow spindle sleeve 646 and splines 662 provided thereon cooperatively engage spindle sleeve 646 to couple spindle 653 and spindle sleeve 646 together for rotation in unison, the spline connection serving to permit axial reciprocation of spindle 653 in conjunction with quill 656 relative to spindle sleeve 646.

Spindle gear 645 is keyed to spindle sleeve 646 by means such as key 659 which couples these two parts for rotation in unison. Bearing nuts 652 and 657 are respectively secured in fixed positions relative to spindle sleeve 646 and spindle 653 by suitable means such as set screws 660 and 661. As shown, lower spindle bearing 655 may be protected from foreign matter and against loss of lubricating oil by suitable means, such as oil seals 663 and 664.

The spindle 653 is adapted to co-operate with cutters and cutter-mounting devices, such as chuck 665 shown in FIG. 1, by means of axially disposed recess 666 shown in FIG. 20.

A binder clamp may be provided to lock quill 656 in fixed relation to head 630. The binder clamp may be similar in construction to the binder clamp previously described and which may be utilized to lock or bind head carrier 601 and overarm cap 513 in fixed relation to each other. As shown in FIG. 20, the quill binder may comprise quill binder nut 667, quill binder sleeve 668 and quill binder stud 669 which extends axially through sleeve 668 and is in threaded engagement with an axial aperture provided in binder nut 667. Quill binder stud 669 is secured to quill binder lever 670, shown in FIG. 1, and is rotatable thereby. Thus, swinging of lever 670, which is also in cooperative abutment with binder sleeve 668, serves to move the binder nut and sleeve together to clamp the quill in a positive fashion when swung in one direction, and to permit their separation to release the quill when swung in the opposite direction.

The speed of rotation of spindle 653 is controlled by levers 675 and 676 shown in FIGS. 1, 21, and 22. Lever 675, shaft 677 and shifter fork 678 are respectively secured together in fixed relation for rotation in unison by suitable means, such as set screws 679 and 680. Shifter lever 675 is in abutment with the outer face of overarm plate 511 through which shaft 677 extends and in which it is journaled for rotation. Shifter fork 678 is in abutting relation with the opposite or inner face of overarm plate 511 and shifter or slide bar 681, which, as shown in FIG. 21, is mounted for reciprocation in a channel or groove provided in overarm plate 511. Slide bar pin 682 is secured in fixed relation to slide bar 681 and projects prependicularly therefrom between arms 683 and 684 of shifter fork 678. Shifter shoe 685 is secured to slide bar 681 by any sutable means, such as screws 686. Shoe 685 has a pair of arms 687 and 688 which are disposed in sliding engagement with rotatable gear portion 573 of cluster gear 568, the radial faces of gear portion 573 being adapted to cooperate with the arms 687 and 688. Slide bar 681 is mounted in substantial parallelism to cluster gear shaft 560 and may be reciprocated longitudinally in the groove provided in overarm plate 511 parallel to the axis of shaft 560 by means of swinging of shifter lever 675. The swinging of lever 675 effects corresponding longitudinal movement of bar 681 and shifter shoe 685 to move cluster gear 573 longitudinally of cluster gear shaft 560 to place the desired gear portion 570, 571, 572, or 573, in driving engagement with the corresponding or mating gear 580, 581, 582, 583 mounted upon intermediate shaft 574.

Shifter lever 676 and shifter fork 673 are secured to shaft 674 for rotation in unison therewith by suitable means such as set screws 689 and 690, fork 673 and lever 676 respectively abutting opposite faces of overarm plate 511 in which shaft 674 is journaled for rotation. The base portion 692 of shifter shoe 691 is received in cooperating reciprocating relation in a groove provided in overarm plate 511 and extending parallel to the axis of intermediate shaft 574. Shifter shoe 691 has a pair of arms which cooperatively engage gear portion 594 of back gear 592, that is, they engage the opposite radial faces of portion 594 for sliding engagement, whereby movement of shifter shoe 691 longitudinally of the groove provided in overarm plate 511 produces a corresponding shifting of back gear 592 longitudinally of portion 590 of shaft 574. As shown in FIG. 22, the portion of shifter shoe 691 projecting from the base portion 692 is substantially cylindrical in form and projects between the arms of shifter fork 673 whereby swinging of lever 676 effects corresponding rotation of shaft 674 and shifter fork 673 to shift shoe 691 to effect axial displacement of back gear 592 relative to shaft 574. Thus the speed of rotation of spindle 653 is determined by the gears utilized to effect rotation of high speed pinion shaft 597 in relation to cluster gear shaft 560. Thus shifter lever 676 might be appropriately referred to as a range selecting lever being adapted to select a high or low range speed of rotation while lever 675 might be referred to as the in range speed selector, the latter being adapted to be moved into one of four positions, each position corresponding to engagement of a respective one of the cluster gear portions 570, 571, 572 and 573 with the respective gear 580, 581, 582, 583 coupled to intermediate shaft 574. Thus lever 675 may be used to select the low, low intermediate, high intermediate, or high speed in each of the two ranges selectable by manipulation of lever 676. When lever 675 and 676 have been positioned as desired, the rotation of spindle 653 is controlled by movement of clutch lever 552 shown in FIG. 1. Thus if lever 552 shown in FIG. 1 is moved away from head 630, clutch yoke 540 swings to move clutch actuator 530 to engage the clutch coupling motor 516 in driving relation with drive shaft 518 to effect rotation of spindle 653. When clutch lever 552 is moved from the clutch engaged position to the opposite limit of travel, clutch actuator 530 is moved to actuate the brake mechanism previously described, to arrest rotation of drive shaft 518 and with it spindle 653.

As shown in FIGS. 17 and 20, quill 656 is mounted in head 630 for axial reciprocation. As shown in FIG. 17, quill key 693 is supported by head 630 in fixed position and projects into a keyway provided in quill 656 to preclude axial rotation of the quill. Key 693 is secured in cooperative relation by means such as quill key retainer 694, shown in FIG. 1.

Quill feed pinion shaft 700 is journaled for rotation in head 630 and hand wheel bell 701 supported by and secured to head cover 629. Wheel 702 is coupled to shaft 700 by means such as key 703. Shaft 700 is secured against axial displacement relative to hand wheel 702 and hand wheel bell 701 by retainer ring 704 and hand wheel nut 705 as shown in FIG. 17. The ring 704 cooperates with an annular groove provided in shaft 700 and nut 705 is in threaded cooperation with shaft 700. Quill feed pinion 706 is secured to shaft 700 for rotation in unison therewith by suitable means, such as taper pin 707. Shaft 700 supports pinion 706 in cooperative relation with rack teeth 708 provided integrally with quill 656 whereby rotation of shaft 700 results in axial displacement of quill 656 relative to head 630. A spring member 709, wound spirally about shaft 700 within hand wheel bell 701 has its ends respectively connected to shaft 700 and hand wheel bell 701. The spring 709 may be prestressed to a degree as desired by rotation of hand wheel bell 701 relative to head 630 and associated head cover 629 until the spring 709 biases shaft 700 toward and into the position it assumes when quill 656 is in the fully retracted position in which it is illustrated in FIG. 20. When hand wheel bell 701 is adjusted to the position in which spring 709 is tensioned as desired, the bell 701 may be secured in fixed relation to head 630 and head cover 629 by means such as screw 710. The quill is at all times coupled mechanically to hand wheel 702 by means of which its axial movement may be controlled. Hand wheel 702 also may be referred to as the coarse manual feed control for quill 656.

To effect fine control of quill 656, hand wheel 711 (shown in FIG. 1) is provided, mounted upon and secured to feed worm shaft 712, shown in FIGS. 16 and 17. Fine feed worm 713, shown generally by dot-dash lines in FIG. 17, is mounted upon and secured to shaft 712 for rotation in unison therewith and in cooperative engagement with worm wheel 714 shown in FIG. 17. Worm 713 and worm wheel 714 are preferably in continuous, mechanical, cooperative relation whereby rotation of fine feed hand wheel 711 is accompanied by corresponding rotation of worm 713 and worm wheel 714. A plurality of integral clutch teeth 715 are provided upon the hub of worm wheel 714. Clutch teeth 715, as shown, project axially from the radial face of the hub of worm wheel 714. Worm wheel 714 is mounted upon quill feed pinion shaft 700 between a radial shoulder face 698 thereof and retaining ring 716 in cooperative engagement with the annular groove provided in shaft 700. Driven clutch 717, having integral clutch teeth 718 projecting axially therefrom and adapted to cooperatively engage teeth 715, is mounted for reciprocation longitudinally of feed pinion shaft 700 and coupled thereto for rotation in unison therewith by pin 719. Driven clutch 717 has an elongated, cylindrical hub portion in which a pair of opposed somewhat delta-shaped apertures 736 are provided, as shown in FIGS. 17 and 23. Each of the duplicate apertures 736 is bounded by a face comprising a radial face portion 737, a pair of symmetrically disposed right helicoidal face portions 738 and 739 and connecting cylindrical concave face portions 783, 784, and 785 which have the same curvature as the cylindrical surface of pin 719. Each of the face portions 738 and 739 shown in FIG. 23 are 15° right helicoidal surfaces relative to their plane of symmetry and thus are disposed at 30° to each other. Each aperture bounding face is thus engaged by pin 719 in line contact parallel to a radius of shaft 700. When clutch teeth 715 and 718 are in engagement with each other, pin 719 engages face portions 784 and driven clutch 717 is coupled to shaft 700 so as to allow no or very little angular rotation of member 717 relative to shaft 700. However, as member 717 is shifted axially along shaft 700 to advance face portion 737 toward pin 719, increasing relative motion is possible. Coupling of member 717 to shaft 700 by pin 719 in this fashion contributes to the smooth, reliable releasing of the clutch in response to application of torque forces exceeding a predetermined value, as will be understood more clearly from the following portions hereof. Clutch spring abutment 720 disposed annularly about the hub portion of clutch 717, is adapted for reciprocation longitudinally thereof, and for abutment with a radial face of the enlarged portion upon which clutch teeth 718 are provided. Spring abutment 720 is adapted to co-operate with helical clutch spring 721. Spring nut 722 has a sleeve-like hub portion in annular cooperating relation with and slidable along the exterior surface of the hub portion of clutch 717. A portion of spring nut 722 extends radially outwardly from the sleeve-like hub portion into threaded engagement with clutch sleeve 723. As shown in FIG. 17, clutch spring 721 is also adapted to cooperatively engage spring nut 722. Clutch nut 724 is provided in threaded cooperative engagement with the hub portion of clutch member 717 to limit the movement of the spring nut away from clutch teeth 718 under forces applied by partially compressed clutch spring 721. Clutch nut 724 is preferably lockable in fixed relation to clutch 717 and as shown in FIG. 16, may be of the split nut type lockable by clamp screw 732. Clutch nut 724 may be appropriately positioned longitudinally of the hub of clutch member 717 to establish a predetermined minimum load upon clutch spring 721 when spring nut 722 is in abutment with clutch nut 724, the position in which these elements are illustrated in FIG. 17. This clutch nut 724 may be and normally is positioned in fixed relation to clutch 717.

A clutch shifter shaft 725 is journaled for rotation in head 630. Clutch shifter shaft 725 as shown has an integral pinion portion 726. Clutch shifter lever 727 and clutch shifter crank 728 are secured to shaft 725 by any suitable means, such as set screws or pins 729 and 730, respectively, shown in FIG. 17. As shown partly in full lines and partly in dot-dash lines, in FIG. 16 and in FIG. 28, clutch sleeve 723 has an L-shaped aperture or recess 733 into which a portion 731 of shifter crank 728 projects, as shown in FIG. 17. Solid pin portion 731 has a cross-section resembling a figure 8 as shown most clearly in FIG. 28. In FIG. 17 portion 731 is in clutch disengaged position which corresponds to the showing of that member shaded by parallel lines and having a line of symmetry 734 in FIG. 28. When clutch shifter lever 727 is swung to move clutch teeth 718 into cooperative engagement with clutch teeth 715, crank pin portion 731 swings through angle E about the axis through the intersection of the lines of symmetry 734 and 735, the latter being the line of symmetry of 731 when in the position indicated by stippled shading and corresponding to the position in which teeth 715 and 718 are in engagement. Such swinging of crank pin 731 counter-clockwise about its axis effects axial shifting of sleeve 723 along shaft 700 for a distance S (FIG. 28) toward worm wheel 714. Angle E is slightly greater than 90° so as to effect a toggle-like locking of sleeve 723 and portion 731 in clutch engaged position. The clutch teeth 718 are disengaged from teeth 715 by excessive torque forces and teeth 715 will then overrun while spring 721 is compressed by movement of driven clutch 717 toward hand wheel 702. Teeth 715 and 718 will reengage when the torque forces acting through them decrease to values less than the predetermined clutch releasing value or magnitude. Thus counterclockwise rotation of shaft 725, when viewed as shown in FIG. 18, will serve to advance clutch 717 to the left of the position in which it is shown in FIG. 17. Such movement of clutch lever 727 from the position in which it is illustrated in FIG. 17, in a counterclockwise direction into the position in which it is illustrated in FIG. 18, effects corresponding rotation of crank 728 positively shifting clutch sleeve 723 and spring unt 722 threadedly coupled thereto, to the left of the position in which they are shown in FIG. 17. Displacement of spring nut 722 in this direction tends to compress clutch spring 721 and that spring in turn urges spring washer or abutment 720 and through the latter clutch member 717 to the left of the position in which they are shown in FIG. 17. Such manipulation of lever 727 thus effects movement of clutch teeth 718 into cooperative engagement with clutch teeth 715 to establish driving relation through the clutch between worm 714 and feed pinion shaft 700. Clutch teeth 715 and 718 are preferably of a type having inclined cooperative faces so related as to effect disengagement of the cooperating teeth when the torque differential applied to the two clutch elements exceeds a predetermined magnitude. The magnitude of torque force necessary to effect disengagement or overrunning of driving clutch teeth 715 relative to driven clutch teeth 718 is determined by the load upon clutch spring 721 when clutch shifter lever 727 is in the position illustrated in FIG. 18. The compression load on spring 721 is established by the relative positioning of spring nut 722 axially of clutch sleeve 723. Thus when the sleeve 723 and the spring nut 722 are initially in the relative positions shown in FIG. 17 rotation of nut 722 relative to shaft 723 to effect axial movement of nut 722 to the left (into sleeve 723) will increase the torque differential necessary to effect overrunning or disengagement of the clutch teeth 715 and 718. Conversely, rotation of spring nut 722 in the opposite direction to effect its axial displacement to the right of the position in which it is there shown relative to clutch sleeve 723 will decrease the magnitude of torque differential necessary to effect release or overrunning disengagement of the clutch teeth 715 and 718. Worm 713 remains in cooperative relation to worm wheel 714 and may be rotated by hand manipulation of fine feed hand wheel 711 or mechanically by means of overarm motor 516, as will be described below. Thus the clutch mechanism just described serves to protect feed pinion shaft 700 and quill and spindle mechanisms together with any tools carried thereby and work pieces being operated upon from excessive forces likely to result in damage to same.

As is shown in FIGS. 17 and 18, automatic kickout means are provided to disengage clutch teeth 715 and 718 when the quill and spindle assembly has been advanced from the position in which it is shown in FIG. 20 to a predetermined position. Kickout spindle clamp 740, shown in FIGS. 1 and 18, has a split ring portion adapted to cooperatively encircle quill 656 adjacent the lower end thereof and be secured in fixed relation thereto by tightening of binding screw 741. Spindle kickout clamp 740 carries kickout screw 742 in parallel relation to spindle 653. Kickout screw 742 is coupled to kickout spindle clamp 740 by means such as set screw 743 which precludes axial displacement of screw 742 within an aperture provided in clamp 740. Screw 742 projects through a guide bearing aperture provided in rib portion 744 of head 630. As shown in FIGS. 17 and 18, kickout pin 745 and kickout rack 746 are mounted for reciprocation in head 630 parallel to feed pinion shaft 700 and perpendicular to the axis of kickout screw 742. Kickout pin 745 has integral rack teeth 751 in co-operative engagement with kickout pinion 747. Kickout pinion 747 is journaled for rotation in head 630 and also in cooperative engagement with integral rack teeth 752 provided on kickout rack 746. Kickout rack 746 also has integral teeth 753 in co-operative engaging relation with pinion portion 726 of clutch shifter shaft 725. Thus swinging of clutch lever 727 not only serves to engage clutch teeth 718 with teeth 715, but also to shift kickout rack 746, kickout pinion 747, and kickout pin 745 to move the latter to the left from the position in which it is shown in FIG. 17 into the position in which it is shown in FIG. 18. Kickout nut 748 is in threaded, cooperative engagement with kickout screw 742. Rotation of nut 748 relative to screw 742 effects axial displacement of the nut 748 relative to the screw 742. The position of nut 748 axially of screw 742 determines the limit of advancement of quill 656 and spindle 653 carried therein. Lock nut 754 is adapted to lock kickout nut 748 in position as desired longitudinally of screw 742. Nut 748 has a conic face portion 749 adapted to cooperatively engage the conic tip portion 750 of kickout pin 745. Thus as quill 656 advances from head 630, it carries with it screw 742 and associated kickout nut 748 ultimately moving face 749 of nut 748 into cooperative engagement with conic face 750 and further advancement of the quill and nut 748 effects a longitudinal movement of kickout pin 745 from the position in which it is shown in FIG. 18 into the position in which it is shown in FIG. 17. Such movement is accompanied by corresponding movements of cooperating parts and effects rotation of kickout clutch shifter shaft 725 in unison with crank 728, and shifter lever 727 is moved from the position in which it is shown in FIG. 18 to the position in which it is shown in FIG. 17 incident to disengagement of clutch teeth 715 and 718 and advancement of quill 656 is terminated. It may be noted that the kickout mechanism only serves to terminate the coupling of worm wheel 714 to pinion shaft 700, the latter remaining coupled to coarse feed hand wheel 702 by means of which advancement or retraction of quill 656 may be effected without reference to the kickout mechanism just described.

To effect power feed of quill 656 means are provided for rotating worm 714 in response to operation of overarm motor 516.

As shown in FIG. 16, a portion of cross shaft 606 projects to the right of cross shaft gear nut 613. Cross shaft worm 755 is mounted upon the projecting portion of cross shaft 606 and coupled thereto for rotation in unison therewith by any suitable means such as key and pin means not shown. Worm 755 is in driving engagement with worm wheel 756 which is in turn coupled to feed shaft 757 for rotation in unison therewith by suitable means such as a key, or the like, not shown. Feed shaft 757 is preferably journaled in bearing 758 supported by feed shaft plate 759 adjacent its one end and in web or bracket portion 760 which is an integral portion of head 630. First feed gear 761, second feed gear 762, third feed gear 763, and pump cam 764 are respectively keyed to the shaft 757 for rotation in unison therewith, only key 764k cooperating with cam 764 being shown. Spacing collars 765 and 766 are disposed annularly about shaft 757 intermediate the feed gears, as shown in FIG. 16. Thus rotation of cross shaft worm 755 serves to effect corresponding rotation of the feed gears 761, 762, 763 and pump cam 764. Bevel gear shaft 767 is journaled for rotation in head 630 adjacent one of its ends and in integral web or bracket portion thereof 760 at a point spaced from the first mentioned supporting journal means. Bevel gear shaft 767 projects beyond web portion 760 axially into bevel gear 768 which is secured to it by any suitable means, such as keys, set screws, or the like, not shown. A feed gear shifter fork 769 cooperatively engages bevel gear shaft 767 and is adapted for reciprocation longitudinally thereof. A cluster of feed takeoff gears 771, 772 and 773 are mounted upon bevel gear shaft 767 between the arms of feed gear shifter fork 769 for reciprocation longitudinally of the shaft 767 in unison with fork 769. Gears 771, 772 and 773 are coupled by suitable means such as a key, not shown, to bevel gear shaft 767 whereby that shaft rotates in unison with the gears. Gears 771, 772 and 773 are adapted to meshingly cooperate with gears 761, 762 and 763, respectively, as desired.

Feed takeoff gears 771, 772, and 773 may be selectively meshingly engaged with respective feed gears 761, 762, and 763, to mechanically couple bevel gear shaft 767 to feed shaft 757 for related rotation therewith. Reverse shaft 770 extends parallel to shafts 757 and 767 and is journaled for rotation in head 630. Takeoff feed gear shifter fork 769 is in cooperative engagement with reverse lever shaft 770 and adapted for longitudinal reciprocation therealong. As shown in dash lines in FIG. 16, grooves or slots 774 may be provided on opposite sides of shifter fork 769 and extend parallel to the arms 775 and 776 thereof. The slots 774 are each adapted to cooperatively receive a portion of a respective shifter pin 778 secured to and projecting from a respective one of a pair of shifter arms 779 which project radially from feed gear shifter shaft 780. Shifter arms 779 are secured to shaft 780 by means such as set screws 781. Shaft 780 is journaled for rotation in head 630 and is parallel to shaft 712. A shifter lever 777 is provided and secured to shaft 780 by means such as set screw 782. Lever 777 is shown in perspective in FIG. 1 and fragmentally in FIG. 17. Shifter lever 777 has a latch bolt coupled to the lever knob. The latch bolt is spring-biased, to advance into latch recesses provided in head 630 at positions corresponding to the bolt location when a respective pair of gears, one feed gear and one feed takeoff gear are engaged. Thus the knob of lever 777 is pulled away from head 630 to retract the latch bolt from a recess in the head before lever 777 is swung to shift the gears 771, 772, 773 along shaft 767 and then released to secure the lever 777 in the new position by engagement of the latch bolt in a respective recess in head 630. Swinging of the lever 777 effects corresponding rotation of shaft 780 in unison therewith. Rotation of shaft 780 effects swinging of the shifter arm 779. When, as shown in FIG. 16, gears 761 and 771 are in mesh, the latter being larger in diameter than the former, shaft 767 will rotate through an angle smaller than the angle through which 757 is rotated. When shifter 779 is swung in the direction indicated by arrow B, gear 773 may be shifted into meshing cooperation with gear 763 and rotation of shaft 757 through a given angle will effect rotation of shaft 767 through a greater angle. Gears 772 and 762 are of equal diameter, as shown. When shifter arm 779 is swung from the position in which it is shown in FIG. 16 in a direction indicated by the arrow A, gears 762 and 772 may be placed in meshing engagement and shafts 757 and 767 will rotate in unison at the same speed.

As shown in FIGS. 16 and 17, reverse shifter fork 790 is in cooperative engagement with worm shaft 712 and adapted for reciprocation axially thereof. The integral arms 791 and 792 of fork 790 are adapted to cooperate respectively with radial faces of reverse bevel gears 793 and 794. The bevel gears 793 and 794 are keyed to shaft 712 by keys 795 and 796 and adapted for reciprocation axially of shaft 712 in cooperative engagement with arms 791 and 792, by means of which gears 793 and 794 are alternately shiftable into engagement with bevel gear 768. Reverse shifter fork 790 is shifted axially along shaft 712 by shifter cam 797 secured to reverse lever shaft 770 for swinging in unison therewith by means such as set screw 798. As shown in FIG. 16, reverse lever 799 is secured to reverse lever shaft 770 for rotation in unison therewith. The hub of lever 799 is in cooperative abutment with an exterior face portion of head 630 and the stop collar 800 is secured against axial displacement longitudinally of reverse lever shaft 770 by suitable means such as taper pin 801, the collar 800 being in cooperative abutment with a supporting portion of head 630. Reverse lever 799 is shown in FIG. 16 in a position in which bevel gear 794 is in co-operative engagement with bevel gear 768. It may be swung from that position toward the right of the position in which it is shown in FIG. 16 and forward toward the viewer through an arc of substantially 180° to the position which corresponds to the position of shifter fork 790, bevel gear 793 and bevel gear 768 shown in relation to reverse lever cam 797 in FIG. 17. In the latter position bevel gear 768 drives worm shaft 712 through bevel gear 793. For a given direction of rotation of bevel gear 768, for example, clockwise, as shown in FIG. 17, shaft 712 will rotate in a given direction when gear 793 is in engagement with gear 768 and in the opposite direction when gear 794 is in cooperative engagement with bevel gear 768. It may be noted that shifter fork 790 holds or retains gears 793 or 794 in cooperative engagement with gear 768 and shifting of fork 790 away from the position in which it supports one of the gears 793 or 794 in engagement with gear 768 will be accompanied by disengagement of the gear 793 or 794 from gear 768. That is to say that the cooperation of bevel gear 768 with either one of the two gears 793, 794 adapted to cooperate with it, is such that forces are produced which tend to urge the co-operating gear out of engagement therewith.

It may be seen that lever 799 may be utilized to effect reversal of the direction of the rotation of worm 713 by motor 516, to effect reversal of the direction of feeding of quill 656. Reverse lever 799, as shown in FIG. 16, is similar in construction to lever 777 in that it has a latch bolt 802 securely attached to knob 803 and latch bolt 802 is reciprocable in lever 799 and spring biased to advance axially toward head 630 in which appropriately located latch bolt receiving recesses are provided. Such recesses are disposed so that latch bolt 802 may project into same to lock reverse lever 799 in positions corresponding to engagement of bevel gears 793 and 768, or 794 and 768, or engagement of neither 793 nor 794 with 768. As explained previously, clutch members 715 and 718 disengage or overrun when the torque differential through those members exceeds a predetermined limit established by the relationship of clutch sleeve 723 and spring nut 722. This overrunning of the clutch members 715 and 718 also serves to limit the loads imposed on the elements of the power train extending to motor 516 in so far as they are due to feeding of the quill 656.

As shown in FIG. 16, suitable lubricating mechanism may be provided for head 630 actuated by pump cam 764. As shown in FIG. 16, pump cup or piston 810 is biased to ride against cam 764 by spring 811 loaded in compression between piston spring washer 812 and plug 813. A valve ball 814 is urged into co-operative relation with a seat provided in piston cup 810 by valve spring 815 loaded in compression between ball 814 and piston spring washer 812. A similar valve ball 816 is adapted to cooperate with valve seat member 817 and urged thereagainst by valve spring 818 loaded in compression, between ball 816 and cooperating face portion of head 630.

As speed shaft 757 and pump cam 764 rotate in unison, piston cup 810 biased to ride against cam 764 by spring 811 is reciprocated axially within the bore provided in the head 630. As cup 810 moves toward the left from the position in which it is shown in FIG. 16, ball valve 814 seats and lubricant such as oil filling the passage to the left of ball 814, as shown in FIG. 16, is expressed through the port provided in valve seat 817 past valve ball 816 into the several communicating distributor bores for lubricant which extend through head 630. As piston cup 810 returns toward the position in which it is shown in FIG. 16, valve ball 816 seats upon valve seat member 817 to preclude reverse flow of the lubricant previously expressed past ball 816. Valve ball 814 then unseats and additional lubricant flows past it into the chamber to the left thereof, as shown in FIG. 16. Thus, repeated charges of lubricant may be moved in series through the pump and lubricating ducts provided; all of the ducts, however, are not shown.

As shown in FIG. 1, a control switch box 819 is preferably provided for motor controls. As shown, the motor controls may be of the pushbutton type. Pushbuttons 820, 821, 822 control operation of feed drive motor 59. Actuation of button 820 will place motor 59 in operation in reverse direction of rotation. Actuation of button 821 will place it in operation in forward direction of rotation. Actuation of button 822 opens the circuit to stop motor 59. Limit switches 823 and 824 are provided one column 420 and adapted to be actuated by column saddle 462 respectively adjacent the upper and lower limits of its normal travel. Thus power feed movement of saddle 462 down column 420 into co-operative engagement with switch actuating lever arm 825, swings it counterclockwise as viewed in FIG. 1, to throw switch 824 and terminate the flow of current to motor 59. In a similar manner, saddle 462 cooperatively engages lever arm 826 adjacent the upper end of its path.

A second pair of limit switches 827, 828 are provided, mounted upon overarm or ram 502, as shown in FIG. 1. Switch 828, shown most clearly in FIG. 14, is secured in fixed relation to overarm 502 by bolt 832 and is representative of the limit switches 823, 824, 827, and 828. As shown in FIG. 14, switch 828 has an actuating lever arm 829 swingable with its shaft 830. Contact roller 831 is journaled adjacent the free end of lever 829. As overarm 502 is advanced toward the left, as viewed in FIG. 14, roller 831 will contact column saddle end plate 508 (shown in FIGS. 1 and 12) and roll upon the face thereof away from overarm 502 as lever 829 swings clockwise to throw switch 828, turning off motor 59 and thus stopping overarm 502. Switch 827 co-operates with column saddle end plate 507 in a similar manner.

Thus motor 59 is controlled by buttons 820, 821, 822 and by limit switches 823, 824, and 827.

Overarm motor 516 is controlled by push buttons 833, 834, and 835 which respectively place motor 516 in operation in reverse direction, forward direction and terminate operation of motor 516.

Having thus described what presently appears to be a preferred form of embodiment of this invention it will be apparent to those having ordinary skill in the art to which this invention pertains, that various modifications and changes may be made in the illustrated embodiment without departing from the spirit or the scope of the appended claims.

Therefore, what is claimed as new and desired to be secured by letters patent, is:

1. A boring and milling machine having a base, a column supported thereon for rotation about a vertical axis, a sadddle movable up and down the column, an elongate overarm mounted on said saddle for swinging about an horizontal axis, said overarm being shiftable longitudinally parallel to radii of the axis about which it is swingable, a head carrier mounted on said overarm and swingable about an axis parallel to the direction of overarm reciprocation, a head mounted on said head carrier and rotatable about an axis which extends radially from the axis about which said head carrier is rotatable, and a quill supported by said head for reciprocation parallel to a radius of the axis of head rotation and carrying a rotatable spindle adapted to support a cutting tool, power means supported in said base and selectably coupleable in driving relation to said saddle and to said overarm to selectively move one thereof as desired and means for rotating said spindle.

2. A boring and milling machine according to claim 1 characterized by the fact that a table-supporting saddle is mounted upon said base for reciprocation transversely of the column and a work piece supporting table is mounted upon said table supporting-saddle and extending transversely of the column for reciprocation in a plane parallel to the face of the work table and in a direction transversely of the direction of reciprocation of said saddle and that said power means supported in said base is coupleable in driving relation to said table supporting saddle and to said table to selectively move them severally and to move them jointly as and when desired with said movement accompanied by movement of said saddle on said column and said overarm, said movements being positively related.

3. A machine having a base, a saddle mounted for linear reciprocation on said base, a workpiece supporting table mounted on said saddle for linear reciprocation transversely of the line of saddle movement and in a plane parallel to the face of the workpiece supporting table, a column supported for rotation about an axis perpendicular to the plane of table reciprocation, a column saddle movable along said column parallel to the axis thereof, a saddle plate supported by said column saddle for rotation about an axis perpendicular to the column axis, an elongated overarm extending through said saddle plate for longitudinal reciprocation and swingable in unison with said rotatable saddle plate, a head carrier supported by said overarm and swingable about an axis extending longitudinally of said arm, a head supported by said head carrier for rotation about an axis extending radially of said head carrier axis, a spindle supporting quill reciprocable in said head, a spindle for carrying a tool and supported in said quill and means for rotating said spindle.

4. A machine tool having a stationary base, a rotatable column mounted thereon, a column saddle advanceable up and down the column, an overarm, an overarm saddle cooperating with said overarm and secured in pivotal relation to said column saddle, said overarm being shiftable longitudinally in said overarm saddle, means for advancing said column saddle up and down said column and for longitudinally shifting said overarm in said overarm saddle comprising a saddle feed screw supported for rotation and against axial displacement relative to said column and in cooperative engagement with said column saddle, a rack secured to and extending longitudinally of said overarm, an overarm feed pinion supported in cooperative engagement with said rack, a worm pinion shaft supported in said column saddle for rotation in coaxial relation to said overarm saddle, means coupling said worm pinion shaft and said overarm feed pinion for related rotation, a worm wheel secured to said worm pinion shaft for rotation in unison therewith, a worm, means supporting said worm in cooperative engagement with said worm wheel, a rotatable feed shaft extending coaxially and slidably through said worm and parallel to the column axis, means coupling said worm to said feed shaft whereby rotation of said feed shaft effects corresponding longitudinal displacement of said overarm relative to said overarm saddle, a column pinion shaft supported in coaxial relation to said column for rotation and longitudinal reciprocation, a column pinion shaft shifter adapted to axially shift the column pinion shaft between first and second limit positions, means adapted to drivingly couple said column pinion shaft when in first limit position of axial displacement to said saddle feed screw, means adapted to drivingly couple said column pinion shaft when in a second limit position of axial displacement to said feed shaft, a rotatable column bevel gear bracket supported in coaxial relation to said column, a bevel gear pinion shaft supported by said bevel gear bracket, a pair of cooperating bevel gears respectively coupled to said column pinion shaft and said bevel gear pinion shaft and supported in cooperative relation to each other, a hand wheel bracket shaft supported by said base for rotation, means coupling said hand wheel bracket shaft and bevel gear pinion shaft for rotation in unison, whereby rotation of said hand wheel bracket shaft effects advancement of the column saddle along the column when the column pinion shaft is in the first limit position and longitudinal shifting of the overarm in said overarm saddle when the column pinion shaft is in the second limit position.

5. A device according to claim 4, characterized by the fact that means for rotating said overarm saddle relative to said column saddle are provided comprising a worm supported for rotation about and against axial displacement along an axis fixed in relation to the column saddle, a set of worm wheel teeth is provided on the overarm and adapted to cooperate with said worm whereby rotation of the worm effects angular movement of the overarm saddle relative to the column saddle for precise, angular orientation of said overarm saddle relative to said column saddle.

6. In a machine tool having a column supported on a base for rotation about an axis, a set of worm wheel teeth carried by said column and disposed within and protectively housed by said base, column rotating means comprising a cartridge demountably insertable into and securable to said base, a rotatable shaft supported in said cartridge, a hand wheel and a worm secured to said shaft for rotation in unison therewith and supported against axial displacement, and means securing said cartridge in fixed relation to said base with said worm engaging said column worm wheel teeth whereby rotation of said hand wheel effects rotation of said column.

7. In a machine tool having a rotatable column supported on a base, a rotatable, axially shiftable column pinion shaft supported in coaxial relation to said column, a column bevel gear bracket supported for angular movement relative to and in coaxial relation to said column and supporting a bevel gear pinion shaft for rotation about an axis parallel to a radius of the column axis, a first bevel gear secured to said bevel gear shaft for rotation in unison therewith, a second bevel gear supported for rotation in coaxial relation to said column and in meshing engagement with said first bevel gear, said column pinion shaft being coupled to said second bevel gear for rotation in unison therewith and axially reciprocable therein, means for positioning said column pinion shaft axially of said column to effect driving engagement with a predetermined one of a plurality of drivable members supported in relation to said column whereby rotation of said bevel gear pinion shaft may effect corresponding rotation of a predetermined one of said drivable members in engagement with said column pinion shaft irrespective of the position into which the column has been rotated in relation to said base.

8. In a machine tool having a base, a rotatable column supported on the base, a column saddle movable longitudinally of said column, an overarm saddle mounted on said column saddle and rotatable about an axis perpendicular to the direction of column saddle movement, an overarm supported by said overarm saddle for longitudinal movement therein, a rack on said overarm, a pinion cooperating with said rack and supported by said overarm saddle, a shaft supported in coaxial relation to said overarm saddle, at least one gear coupling said shaft and said pinion for related rotation, a worm wheel on said shaft, a feed shaft supported by said column and extending parallel to column saddle movement, a worm coupled to and slidable along said feed shaft for rotation in unison therewith, means for rotating said feed shaft, and a bracket retaining the worm in co-operating, driving relation to said worm wheel and supporting adjacent portions of the feed shaft whereby rotation of said feed shaft effects longitudinal displacement of the overarm independently of the position of movement of the column saddle longitudinally of the column.

9. A device according to claim 8, characterized by the fact that worm wheel teeth are provided in fixed relation to said overarm saddle, a worm is supported in cooperative engagement with a plurality of said teeth for rotation about an axis fixed in relation to the column saddle, and along which axis the worm is not axially shiftable, whereby unison rotation of the overarm saddle and overarm through a desired angle may be effected by rotation of the worm.

References Cited by the Examiner

UNITED STATES PATENTS

| | | | |
|---|---|---|---|
| 462,309 | 11/1891 | Gang | 77—28 |
| 1,073,597 | 9/1913 | Englehard | 77—28 |
| 1,964,352 | 6/1934 | Hazard | 74—353 |
| 2,310,870 | 2/1943 | Retterath | 77—28 |
| 2,499,193 | 2/1950 | Lochman | 90—14 |
| 2,524,091 | 10/1950 | Zimmerman | 90—13.5 X |
| 2,604,019 | 7/1952 | Malnar | 90—17 |
| 2,619,879 | 12/1952 | Hosea | 90—17 |
| 2,653,519 | 9/1953 | Armitage et al. | 90—21 |
| 2,682,203 | 6/1954 | Senn | 90—21 |
| 2,688,257 | 9/1954 | Hathaway | 73—353 |
| 2,690,246 | 9/1954 | Kelleigh | 192—66 |
| 2,727,610 | 12/1955 | Frerer et al. | 192—66 |
| 2,831,237 | 4/1958 | Bannow. | |
| 2,835,021 | 5/1958 | O'Malley. | |
| 2,835,172 | 5/1958 | Barker et al. | 90—17 |
| 2,901,946 | 9/1959 | Grabes | 90—14 |

FOREIGN PATENTS

| | | |
|---|---|---|
| 851,627 | 10/1939 | France. |
| 138,397 | 2/1920 | Great Britain. |

OTHER REFERENCES

American Machinist, publication dated April 5, 1928, Giddings & Lewis' advertisement, page 33.

WILLIAM W. DYER, Jr., *Primary Examiner.*

THOMAS E. BEALL, J. SPENCER OVERHOLSER,
*Examiners.*